(12) United States Patent
Li et al.

(10) Patent No.: US 9,137,698 B2
(45) Date of Patent: Sep. 15, 2015

(54) BEAM MANAGEMENT FOR WIRELESS COMMUNICATION

(71) Applicant: Samsung Electronics Co., LTD, Suwon-si, Gyeonggi-do (KR)

(72) Inventors: Ying Li, Richardson, TX (US); Zhouyue Pi, Allen, TX (US); Shadi Abu-Surra, Plano, TX (US); Sridhar Rajagopal, Plano, TX (US); Kaushik Josiam, Dallas, TX (US)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 165 days.

(21) Appl. No.: 13/772,047

(22) Filed: Feb. 20, 2013

(65) Prior Publication Data

US 2013/0223251 A1     Aug. 29, 2013

Related U.S. Application Data

(60) Provisional application No. 61/603,183, filed on Feb. 24, 2012.

(51) Int. Cl.
*H04L 12/801* (2013.01)
*H04L 12/26* (2006.01)
(Continued)

(52) U.S. Cl.
CPC ............. *H04W 24/10* (2013.01); *H04B 7/0617* (2013.01); *H04B 7/0619* (2013.01); *H04B 7/0689* (2013.01); *H04W 72/046* (2013.01)

(58) Field of Classification Search
CPC ....... H04L 47/10; H04L 43/50; H04W 52/02; H04W 52/0216; H04W 52/24; H04W 52/50

USPC ................................... 370/252, 311; 455/522
See application file for complete search history.

(56) References Cited

U.S. PATENT DOCUMENTS 6,016,421 A * 1/2000 Weiss et al. .................. 455/63.4
7,146,164 B2 12/2006 Hunzinger
(Continued)

FOREIGN PATENT DOCUMENTS

KR   2009/0046082 A   5/2009
KR   2010/0137341 A   12/2010

OTHER PUBLICATIONS

International Search Report dated Jun. 26, 2013 in connection with International Patent Application No. PCT/KR2013/001467, 5 pages.

(Continued)

*Primary Examiner* — Ronald B Abelson

(57) ABSTRACT

Methods and apparatuses manage beam selection. A method for a mobile station (MS) includes identifying beamforming constraints of the MS. The method also includes performing measurement on a channel between a base station (BS) and the MS on at least one transmit (TX) beam and at least one receive (RX) beam. Additionally, the method includes sending beamforming feedback information based on the identified constraints of the MS and the channel measurement. A method for a base station (BS) includes receiving beamforming feedback information comprising at least one of radio frequency beamforming constraints of a mobile station or channel measurement information on a channel between the BS and the MS. Additionally, the method includes sending, to the MS, control information comprising an indication of at least one of MS RX beams or BS TX beams to be used in downlink communication with the MS based on the received beamforming feedback information.

20 Claims, 17 Drawing Sheets

(51) Int. Cl.

| | | |
|---|---|---|
| *H04W 52/02* | (2009.01) | |
| *H04W 52/24* | (2009.01) | |
| *H04W 52/50* | (2009.01) | |
| *H04W 24/10* | (2009.01) | |
| *H04W 72/04* | (2009.01) | |
| *H04B 7/06* | (2006.01) | |

(56) References Cited

U.S. PATENT DOCUMENTS

| | | |
|---|---|---|
| 7,236,478 B2 | 6/2007 | Wu et al. |
| 8,543,063 B2 * | 9/2013 | Bergel et al. ............ 455/63.1 |
| 2009/0086690 A1 | 4/2009 | Gu et al. |
| 2009/0231187 A1 | 9/2009 | Churan |
| 2009/0233545 A1 | 9/2009 | Sutskover et al. |
| 2009/0290563 A1 | 11/2009 | Gu et al. |
| 2010/0238824 A1 | 9/2010 | Farajidana et al. |
| 2011/0045785 A1 | 2/2011 | Sutskover et al. |
| 2011/0105174 A1 * | 5/2011 | Pelletier et al. ............ 455/522 |

OTHER PUBLICATIONS

Written Opinion of International Searching Authority dated Jun. 26, 2013 in connection with International Patent Application No. PCT/KR2012/001467, 6 pages.

* cited by examiner

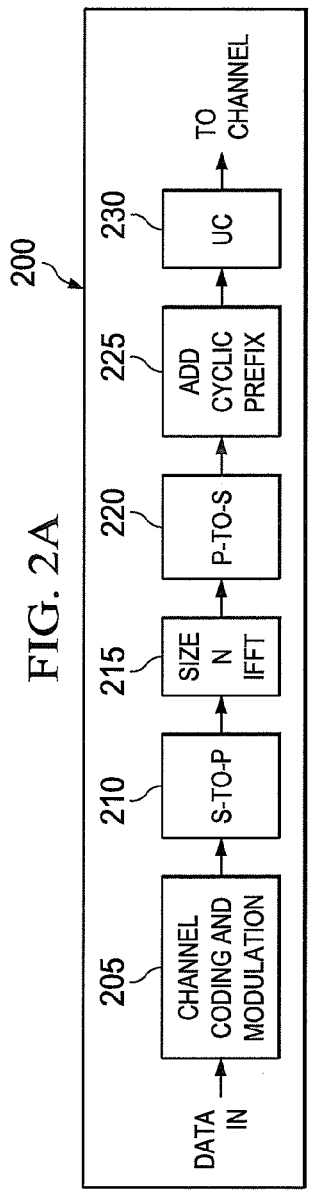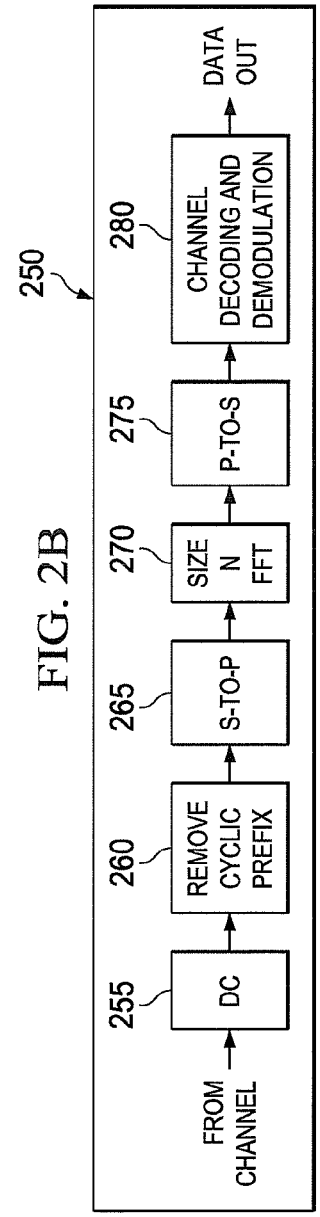

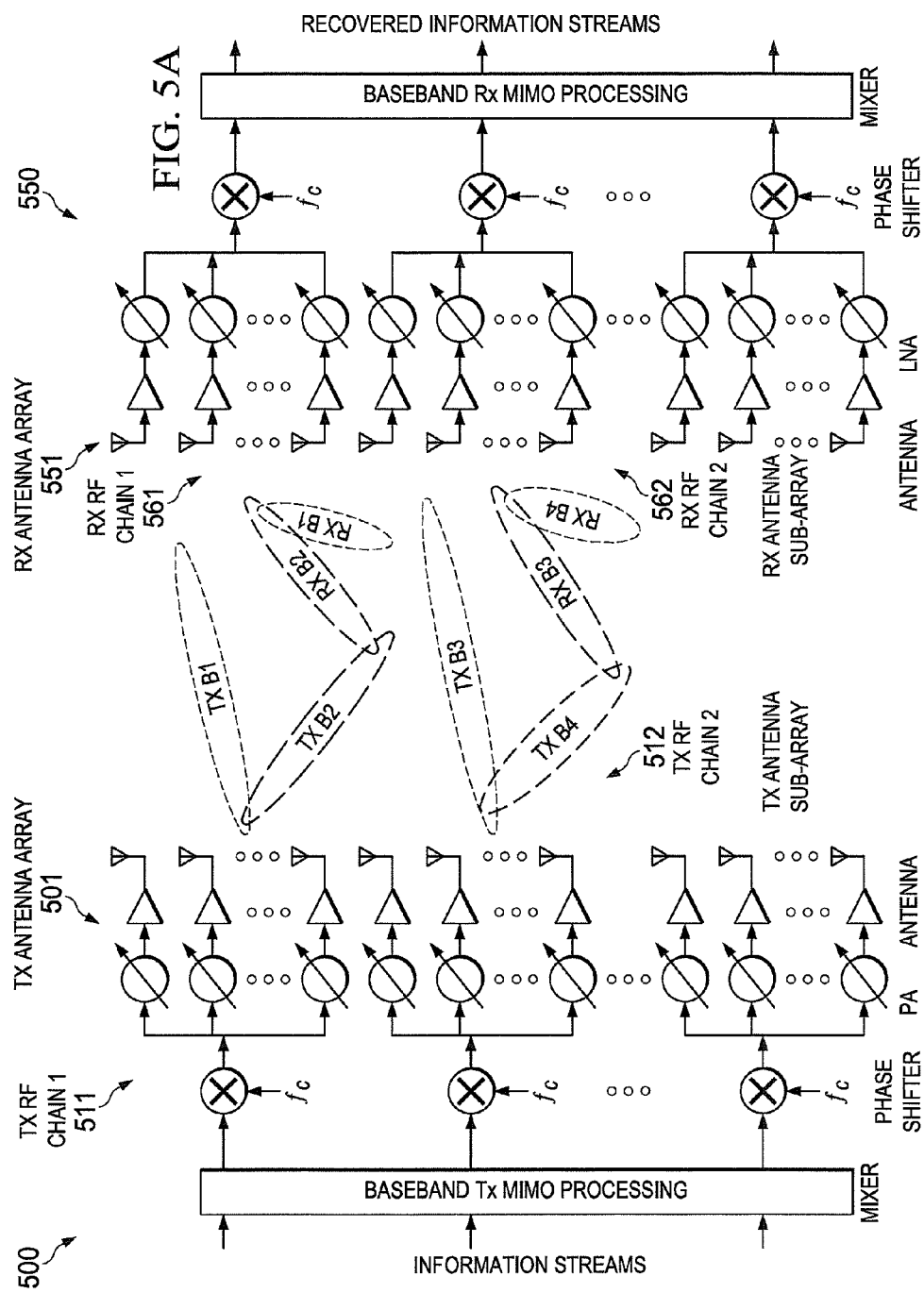

BEAM MANAGEMENT FOR WIRELESS COMMUNICATION

CROSS-REFERENCE TO RELATED APPLICATION(S) AND CLAIM OF PRIORITY

The present application claims priority to U.S. Provisional Patent Application Ser. No. 61/603,183 filed Feb. 24, 2012, entitled "BEAM MANAGEMENT IN MILLIMETER WAVE COMMUNICATIONS". The content of the above-identified patent document is incorporated herein by reference.

TECHNICAL FIELD

The present application relates generally to wireless communication using transmit (TX) and receive (RX) beams and, more specifically, to managing TX and RX beams in used wireless communication.

BACKGROUND

In recent years, the number of subscribers to mobile communication services has exceeded five billion and is growing quickly. Mobile communication technologies have been developed to attempt to satisfy the increasing demand and to provide more and better mobile communication applications and services. As more people use mobile communication systems and more services are provided over these systems, there is an increasing need for mobile communication systems with larger capacity, higher throughput, lower latency, and better reliability.

Therefore, there is a need for improved wireless communication systems and, more specifically, to beam management in wireless communication.

SUMMARY

Embodiments of the present disclosure provide methods and apparatuses for beam management in wireless communication.

In one embodiment, a method for beam management by a mobile station is provided. The method includes identifying beamforming constraints of the MS. The method also includes performing measurement on a channel between a base station (BS) and the MS on at least one transmit (TX) beam and at least one receive (RX) beam. Additionally, the method includes sending RF beamforming feedback information based on the identified constraints of the MS and the channel measurement.

In another embodiment, a method for beam management by a base station is provided. The method includes receiving beamforming feedback information comprising at least one of radio frequency beamforming constraints of a mobile station or channel measurement information on a channel between the BS and the MS. Additionally, the method includes sending, to the MS, control information comprising an indication of at least one of MS RX beams or BS TX beams to be used in downlink communication with the MS based on the received beamforming feedback information.

In yet another embodiment, an apparatus for beam management in a mobile station is provided. The apparatus includes a controller and a transceiver. The controller is configured to identify beamforming constraints of the MS, and performing measurement on a channel between a base station (BS) and the MS on at least one transmit (TX) beam and at least one receive (RX) beam. The transceiver is configured to send RF beamforming feedback information based on the identified RF constraints of the MS and the channel measurement.

In another embodiment, an apparatus for beam management in a base station is provided. The apparatus includes a controller and a transceiver. The transceiver is configured to receive beamforming feedback information comprising at least one of radio frequency beamforming constraints of a mobile station or channel measurement information on a channel between the BS and the MS. The transceiver is also configured to send, to the MS, control information comprising an indication of at least one of MS RX beams or BS TX beams to be used in downlink communication with the MS based on the received beamforming feedback information.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 2A is a high-level diagram of an orthogonal frequency division multiple access (OFDMA) or millimeter wave transmit path, according to various embodiments of the present disclosure;

FIG. 2B is a high-level diagram of an OFDMA or millimeter wave receive path, according to various embodiments of the present disclosure;

FIG. 5A illustrates an example of beamforming capabilities of a transmitter and a receiver in accordance with an exemplary embodiment of the present disclosure;

DETAILED DESCRIPTION

Figure 1:
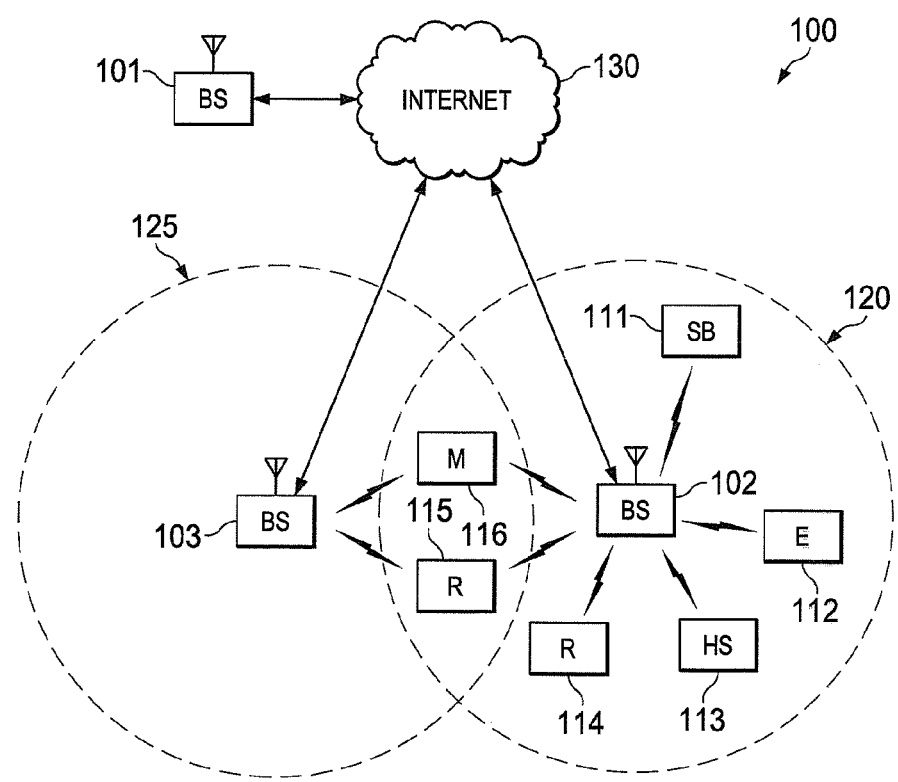
FIG. 1 illustrates an exemplary wireless system according to various embodiments of the present disclosure.

FIGS. 1 through 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Aspects, features, and advantages of the disclosure are readily apparent from the following detailed description, through illustration of a number of embodiments and implementations. The disclosure also encompasses other and different embodiments, and its several details can be modified in various obvious respects, all without departing from the spirit and scope of the disclosure.

In this disclosure, a limited number and type of base stations and mobile stations, service flows, connections, routes, or use cases may be used as examples for illustration. However, the embodiments disclosed herein are also applicable to other numbers and types of base stations, mobile stations, service flows, connections, routes, and other related use cases.

The following documents and standards descriptions are hereby incorporated into the present disclosure as if fully set forth herein: (i) F. Khan and Z. Pi., "MmWave Mobile Broadband (MMB): Unleashing the 3-300 GHz Spectrum", in Proc. Sarnoff Symposium, 2011 (hereinafter "REF1"); (ii) Z. Pi and F. Khan, "An Introduction To Millimeter-Wave Mobile Broadband Systems", IEEE Communication Magazine, June 2011 (hereinafter "REF2"); and (iii) Z. Pi and F. Khan, "System Design And Network Architecture For A Millimeter-Wave Mobile Broadband (MMB) System", in Proc. Sarnoff Symposium, 2011 (hereinafter "REF3").

The demand for wireless data traffic is rapidly increasing due to rising popularity among consumers and businesses of smart phones and other mobile data devices such as notepads, netbooks, and eBook readers. In order to meet the high growth in mobile data traffic, improvements in radio interface efficiency and allocation of new spectrum is of paramount importance.

The current fourth generation wireless communication systems ("4G systems"), including LTE and Mobile WiMAX, use advanced technologies, such as OFDM (Orthogonal Frequency Division Multiplexing), MIMO (Multiple Input Multiple Output), multi-user diversity, link adaptation, and the like, in order to achieve spectral efficiencies which are close to theoretical limits in terms of bps/Hz/cell. Continuous improvements in air-interface performance are being considered by introducing new techniques, such as carrier aggregation, higher order MIMO, coordinated Multipoint (CoMP) transmission and relays, and the like. However, it is generally agreed that any further improvements in spectral efficiency will likely be marginal.

When spectral efficiency in terms of bps/Hz/cell cannot be improved significantly, another possibility to increase capacity is to deploy many smaller cells. However, the number of small cells that can be deployed in a geographic area can be limited due to costs involved with acquiring the new site, installing the equipment, provisioning backhaul, and so forth. In theory, to achieve a one-thousand-fold increase in capacity, the number of cells also needs to be increased by the same factor. Another drawback of very small cells is frequent handoffs, which increase network signaling overhead and latency. Thus, while small cells may be a component of future wireless networks, the small cells alone are not expected to meet the capacity required to accommodate orders of magnitude increase in mobile data traffic demand in a cost-effective manner.

In addition to the new technologies described above, more technologies are being explored to meet the explosive demand of mobile data. REF1, REF2, and REF3 discuss the use Millimeter-wave band (3-300 GHz spectrum) for Mobile Broadband (MMB) applications with wide area coverage. Key advantages for these frequencies are spectrum availability and small component sizes, such as antennas and other radio devices, due to short wavelengths. Due to their smaller wavelengths, more millimeter wave antennas can be placed in a relative small area, thus enabling a high-gain antenna in a small form factor. Larger bands can be used, and higher throughput can be achieved using MMB communications compared to current 4G systems.

In certain cellular systems, a mobile station (MS) can detect a base station (BS) using one or more omni-receiving antennas or antennas with a very wide beam. These features permit the MS to easily listen to the downlink signal from the BS and detect the BS.

However, in future wireless communication systems with directional antennas or antenna arrays, such as an MMB wireless communication system, the received beams may be narrow and receive beam forming may be needed. One of the challenges for future wireless communication systems is how to manage beams. These challenges may be especially present when there are capability limitations on beamforming, such as some beams cannot be formed or used at the same time due to physical constraints of the communication device.

Embodiments of the present disclosure recognize that wireless communication devices, such as MSs and BSs, may have physical constraints in their beamforming capabilities. Embodiments of the present disclosure further recognize that communication of such physical constraints and beamforming capabilities may be necessary for efficient wireless communication. Accordingly, embodiments of the present disclosure provide systems and methods for managing selection of beams for wireless communication. Embodiments of the present disclosure also provide systems and methods for identifying device beamforming constraints and communicating feedback information to properly manage beam including beam selection, communication mode selection over the selected beam(s), forming the selected beam(s), and the like, for efficient and reliable wireless communication.

FIGS. 1-2B below describe various embodiments implemented in wireless communication systems and with the use of OFDM or OFDMA communication techniques. The description of FIGS. 1-2B is not meant to imply physical or architectural limitations to the manner in which different embodiments may be implemented. Different embodiments of the present disclosure may be implemented in any suitably arranged communications system.

FIG. 1 illustrates exemplary wireless system 100, which transmits messages according to the principles of the present disclosure. In the illustrated embodiment, wireless system 100 includes transmission points (e.g., an Evolved Node B (eNB), Node B), such as base station (BS) 101, base station (BS) 102, base station (BS) 103, and other similar base stations or relay stations (not shown). Base station 101 is in communication with base station 102 and base station 103. Base station 101 is also in communication with Internet 130 or a similar IP-based system (not shown).

Base station 102 provides wireless broadband access (via base station 101) to Internet 130 to a first plurality of mobile stations (e.g., mobile phone, user equipment, subscriber station) within coverage area 120 of base station 102. The first plurality of mobile stations includes mobile station 111, which may be located in a small business (SB); mobile station 112, which may be located in an enterprise (E); mobile station 113, which may be located in a WiFi hotspot (HS); mobile station 114, which may be located in a first residence (R); mobile station 115, which may be located in a second residence (R); and mobile station 116, which may be a mobile device (M), such as a cell phone, a wireless laptop, a wireless PDA, or the like.

Base station 103 provides wireless broadband access (via base station 101) to Internet 130 to a second plurality of mobile stations within coverage area 125 of base station 103. The second plurality of mobile stations includes mobile station 115 and mobile station 116. In an exemplary embodiment, base stations 101-103 may communicate with each other and with mobile stations 111-116 using OFDM or OFDMA techniques.

While only six mobile stations are depicted in FIG. 1, it is understood that wireless system 100 may provide wireless broadband access to additional mobile stations. It is noted that mobile station 115 and mobile station 116 are located on the edges of both coverage area 120 and coverage area 125. Mobile station 115 and mobile station 116 each communicate with both base station 102 and base station 103 and may be said to be operating in handoff mode, as known to those of skill in the art.

Mobile stations 111-116 may access voice, data, video, video conferencing, and/or other broadband services via Internet 130. In an exemplary embodiment, one or more of mobile stations 111-116 may be associated with an access point (AP) of a WiFi WLAN. Mobile station 116 may be any of a number of mobile devices, including a wireless-enabled laptop computer, personal data assistant, notebook, handheld device, or other wireless-enabled device. Mobile stations 114 and 115 may be, for example, a wireless-enabled personal computer (PC), a laptop computer, a gateway, or another device.

FIG. 2A is a high-level diagram of transmit path circuitry 200. For example, the transmit path circuitry 200 may be used for an orthogonal frequency division multiple access (OFDMA) communication. FIG. 2B is a high-level diagram of receive path circuitry 250. For example, the receive path circuitry 250 may be used for an orthogonal frequency division multiple access (OFDMA) communication. In FIGS. 2A and 2B, for downlink communication, the transmit path circuitry 200 may be implemented in base station (BS) 102 or a relay station, and the receive path circuitry 250 may be implemented in a mobile station (e.g. mobile station 116 of FIG. 1). In other examples, for uplink (UL) communication, the receive path circuitry 250 may be implemented in a base station (e.g. base station 102 of FIG. 1) or a relay station, and the transmit path circuitry 200 may be implemented in a mobile station (e.g. mobile station 116 of FIG. 1).

Transmit path circuitry 200 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, and up-converter (UC) 230. Receive path circuitry 250 comprises down-converter (DC) 255, remove cyclic prefix block 260, serial-to-parallel (S-to-P) block 265, Size N Fast Fourier Transform (FFT) block 270, parallel-to-serial (P-to-S) block 275, and channel decoding and demodulation block 280.

At least some of the components in FIGS. 2A and 2B may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In transmit path circuitry 200, channel coding and modulation block 205 receives a set of information bits, applies coding (e.g., LDPC coding) and modulates (e.g., Quadrature Phase Shift Keying (QPSK) or Quadrature Amplitude Modulation (QAM)) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and MS 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to radio frequency (RF) for transmission via a wireless channel. The signal may also be filtered at baseband before conversion to RF.

The transmitted RF signal arrives at MS 116 after passing through the wireless channel, and reverse operations to those at BS 102 are performed. Down-converter 255 down-converts the received signal to baseband frequency, and remove cyclic prefix block 260 removes the cyclic prefix to produce the serial time-domain baseband signal. Serial-to-parallel block 265 converts the time-domain baseband signal to parallel time-domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to mobile stations 111-116 and may implement a receive path that is analogous to receiving in the UL from mobile stations 111-116. Similarly, each one of mobile stations 111-116 may implement a transmit path corresponding to the architecture for transmitting in the UL to base stations 101-103 and may implement a receive path corresponding to the architecture for receiving in the downlink from base stations 101-103.

In various embodiments of the present disclosure, a base station (BS) can have one or multiple cells, and each cell can have one or multiple antenna arrays, where each array within a cell can have different frame structures, (e.g., different uplink and downlink ratios in a time division duplex (TDD) system). Multiple TX/RX (transmitting/receiving) chains can be applied in one array or in one cell. One or multiple antenna arrays in a cell can have the same downlink control channel (e.g., synchronization channel, physical broadcast channel, and the like) transmission, while the other channels (e.g., data channel) can be transmitted in the frame structure specific to each antenna array.

The base station can use one or more antennas or antenna arrays to carry out beam forming. Antenna arrays can form beams having different widths (e.g., wide beam, narrow beam, etc.). Downlink control channel information, broadcast signals and messages, and broadcast data channels and control channels can be transmitted, e.g., in wide beams. A wide beam may include a single wide beam transmitted at one time or a sweep of narrow beams at sequential times. Multicast and unicast data and control signals and messages can be transmitted, e.g., in narrow beams.

Identifiers of cells can be carried in the synchronization channel. Identifiers of arrays, beams, and the like, can be implicitly or explicitly carried in the downlink control channels (e.g., synchronization channel, physical broadcast channel, and the like). These channels can be sent over wide beams. By acquiring these channels, the mobile station (MS) can detect the identifiers.

A mobile station (MS) can also use one or more antennas or antenna arrays to carry out beam forming. As in BS antenna arrays, antenna arrays at the MS can form beams with different widths (e.g., wide beam, narrow beam, etc.). Broadcast signals and messages and broadcast data channels and control channels can be transmitted, e.g., in wide beams. Multicast and unicast data and control signals and messages can be transmitted, e.g., in narrow beams.

The beams can be in various shapes or can have various beam patterns. The beam shapes or the beam patterns can be regular or irregular, e.g., pencil beam shape, cone beam shape, irregular main lobe with side lobes, and the like. The beams can be formed, transmitted, received, using, e.g., the transmit paths and the receive paths in FIGS. 3A through 3D. For example, the transmit paths and the receive paths in FIGS. 3A through 3D may be located in transceivers of wireless communication devices at different points in a wireless communication (e.g., transmit paths and receive paths in one or more of the base stations 101-103 or the mobile stations 111-116 in FIG. 1).

Figure 3A:
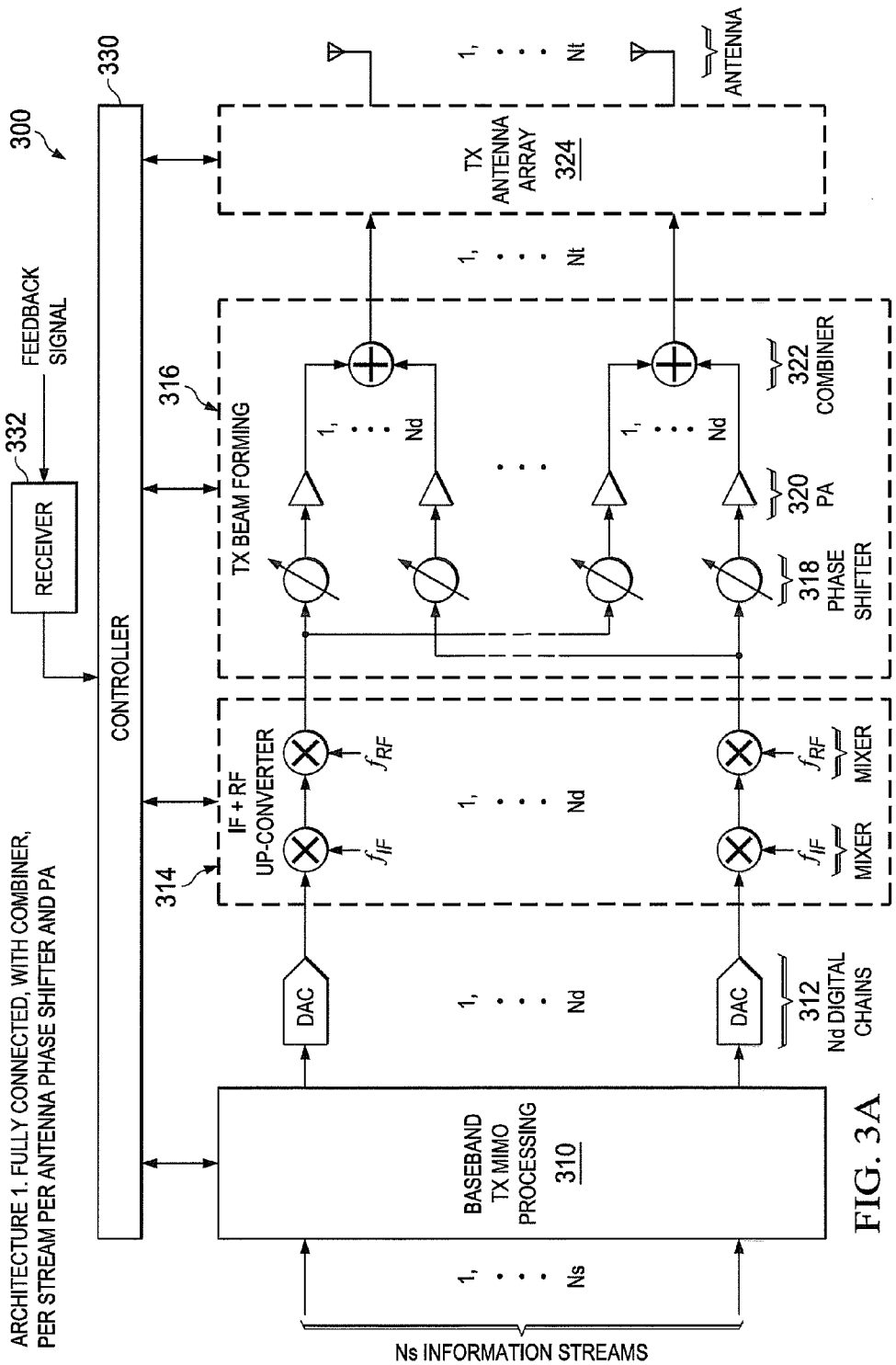
FIG. 3A illustrates a transmit path for multiple input multiple output (MIMO) baseband processing and analog beam forming with a large number of antennas, according to various embodiments of the present disclosure.

FIG. 3A illustrates a transmit path for multiple input multiple output (MIMO) baseband processing and analog beam forming with a large number of antennas, according to embodiments of this disclosure. The transmit path 300 includes a beam forming architecture in which all of the signals output from baseband processing are fully connected to all the phase shifters and power amplifiers (PAs) of the antenna array.

As shown in FIG. 3A, Ns information streams are processed by a baseband processor (not shown), and input to the baseband TX MIMO processing block 310. After the baseband TX MIMO processing, the information streams are converted at a digital and analog converter (DAC) 312 and further processed by an interim frequency (IF) and RF up-converter 314, which converts the baseband signal to the signal in RF carrier band. In some embodiments, one information stream can be split to I (in-phase) and Q (quadrature) signals for modulation. After the IF and RF up-converter 314, the signals are input to a TX beam forming module 316.

FIG. 3A shows one possible architecture for the TX beam forming module 316, where the signals are fully connected to all the phase shifters and power amplifiers (PAs) of the transmit antennas. Each of the signals from the IF and RF up-converter 314 can go through one phase shifter 318 and one PA 320, and via a combiner 322, all the signals can be combined to contribute to one of the antennas of the TX antenna array 324. In FIG. 3A, there are Nt transmit antennas in the TX antenna array 324. Each antenna can have one or multiple antenna elements. Each antenna transmits the signal over the air. A controller 330 can interact with the TX modules, including the baseband processor, IF and RF up-converter 314, TX beam forming module 316, and TX antenna array 324. A receiver module 332 can receive feedback signals, and the feedback signals can be input to the controller 330. The controller 330 can process the feedback signal and adjust the TX modules.

Figure 3B:
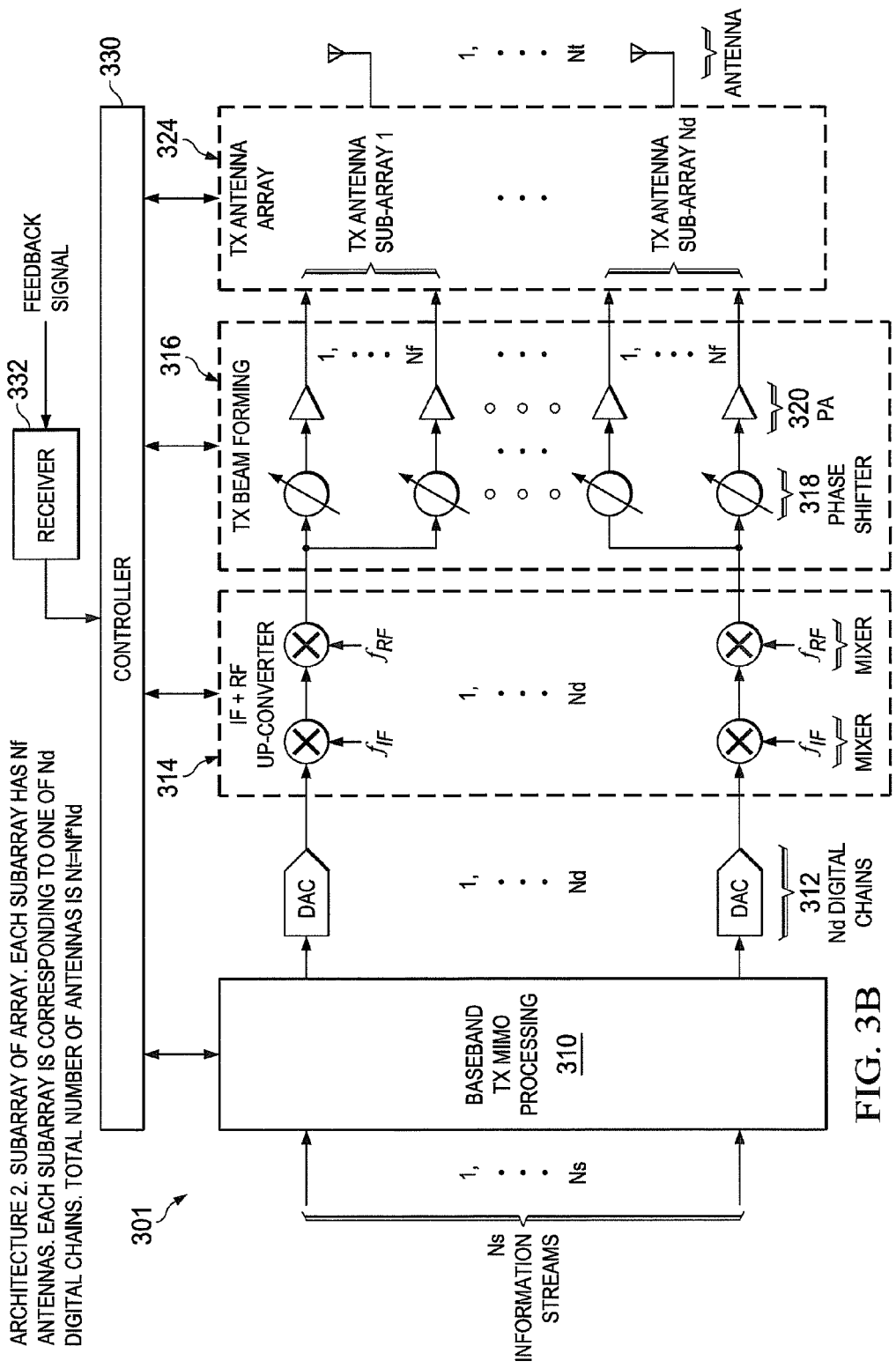
FIG. 3B illustrates another transmit path for MIMO baseband processing and analog beam forming with a large number of antennas, according to various embodiments of the present disclosure.

FIG. 3B illustrates another transmit path for MIMO baseband processing and analog beam forming with a large number of antennas, according to embodiments of this disclosure. The transmit path 301 includes a beam forming architecture in which a signal output from baseband processing is connected to the phase shifters and power amplifiers (PAs) of a sub-array of the antenna array. The transmit path 301 is similar to the transmit path 300 of FIG. 3A, except for differences in the TX beam forming module 316.

As shown in FIG. 3B, the signal from the baseband is processed through the IF and RF up-converter 314, and is input to the phase shifters 318 and power amplifiers 320 of a sub-array of the antenna array 324, where the sub-array has Nf antennas. For the Nd signals from baseband processing (e.g., the output of the MIMO processing), if each signal goes to a sub-array with Nf antennas, the total number of transmitting antennas Nt should be Nd*Nf. The transmit path 301 includes an equal number of antennas for each sub-array. However, the disclosure is not limited thereto. Rather, the number of antennas for each sub-array need not be equal across all sub-arrays.

The transmit path 301 includes one output signal from the MIMO processing as the input to the RF processing with one sub-array of antennas. However, this disclosure is not limited thereto. Rather, one or multiple signals out of the Nd signals from baseband processing (e.g., the output of the MIMO processing) can be the inputs to one of the sub-arrays. When multiple output signals from the MIMO processing are as the inputs to one of the sub-arrays, each of the multiple output signals from the MIMO processing can be connected to part of or all of the antennas of the sub-array. For example, the RF and IF signal processing with each of the sub-array of antennas can be the same as the processing with the array of antennas as in FIG. 3A, or any type of the RF and IF signal processing with an array of antennas. The process related to one sub-array of the antennas may be referred to as one "RF chain".

Figure 3C:
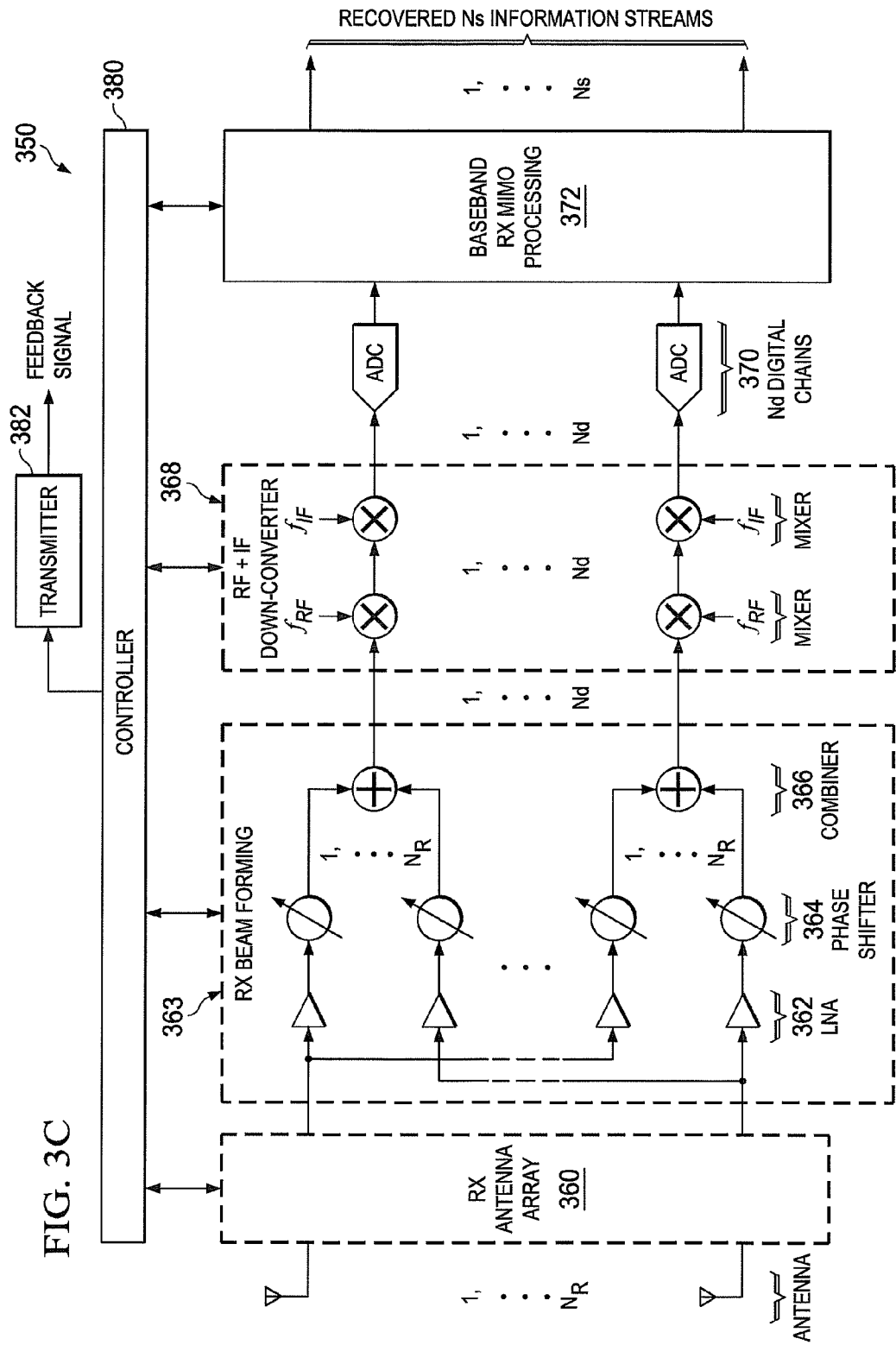
FIG. 3C illustrates a receive path for MIMO baseband processing and analog beam forming with a large number of antennas, according to various embodiments of the present disclosure.

FIG. 3C illustrates a receive path for MIMO baseband processing and analog beam forming with a large number of antennas, according to embodiments of this disclosure. The receive path 350 includes a beam forming architecture in which all of the signals received at the RX antennas are processed through an amplifier (e.g., a low noise amplifier (LNA)) and a phase shifter. The signals are then combined to form an analog stream that can be further converted to the baseband signal and processed in a baseband.

As shown in FIG. 3C, NR receive antennas 360 receive the signals transmitted by the transmit antennas over the air. Each receive antenna can have one or multiple antenna elements. The signals from the RX antennas are processed through the LNAs 362 and the phase shifters 364. The signals are then combined at a combiner 366 to form an analog stream. In total, Nd analog streams can be formed. Each analog stream can be further converted to the baseband signal via an RF and IF down-converter 368 and an analog to digital converter (ADC) 370. The converted digital signals can be processed in a baseband RX MIMO processing module 372 and other baseband processing, to obtain the recovered NS information streams. A controller 380 can interact with the RX modules including the baseband processor, RF and IF down-converter 368, RX beam forming module 363, and RX antenna array module 360. The controller 380 can send signals to a transmitter module 382, which can send a feedback signal. The controller 380 can adjust the RX modules and determine and form the feedback signal.

Figure 3D:
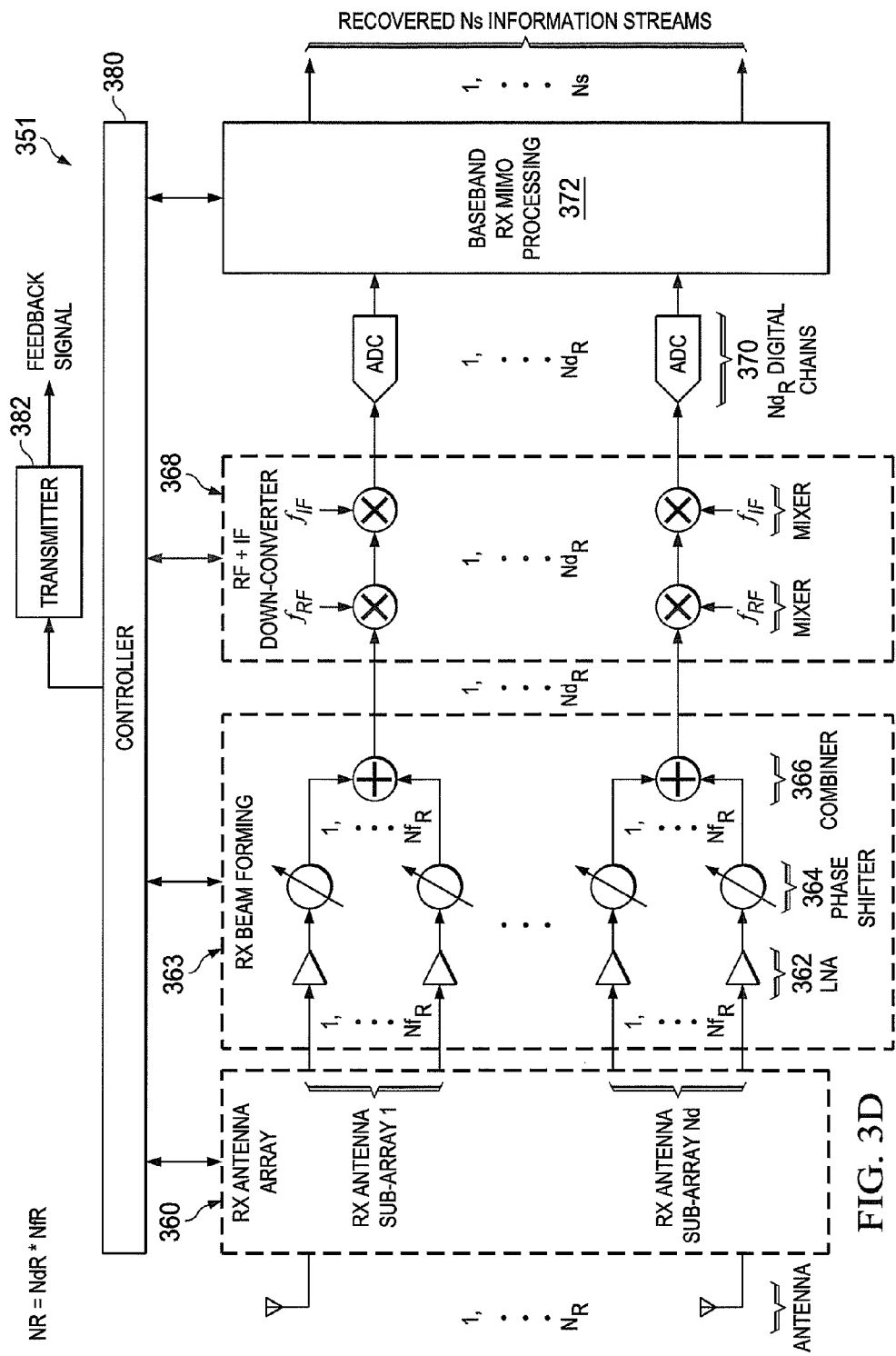
FIG. 3D illustrates another receive path for MIMO baseband processing and analog beam forming with a large number of antennas, according to various embodiments of the present disclosure.

FIG. 3D illustrates another receive path for MIMO baseband processing and analog beam forming with a large number of antennas, according to embodiments of this disclosure. The receive path 351 includes a beam forming architecture in which the signals received by a sub-array of the antenna array can be processed by amplifiers and phase shifters to form an analog stream that can be converted and processed in the baseband. The receive path 351 is similar to the receive path 350 of FIG. 3C, except for differences in the beam forming module 363.

As shown in FIG. 3D, the signals received by NfR antennas of a sub-array of the RX antenna array 360 are processed by the LNAs 362 and phase shifters 364, and are combined at combiners 366 to form an analog stream. There can be NdR sub-arrays (NdR=NR/NFR) with each sub-array forming one analog stream. Hence, in total, NdR analog streams can be formed. Each analog stream can be converted to the baseband signal via an RF and IF down-converter 368 and an ADC 370. The NdR digital signals are processed in the baseband module 372 to recover the Ns information streams. The receive path 351 includes an equal number of antennas for each sub-array. However, the disclosure is not limited thereto. Rather, the number of antennas for each sub-array need not be equal across all sub-arrays.

The receive path 351 includes one output signal from the RF processing with one sub-array of antennas, as one of the inputs to the baseband processing. However, this disclosure is not limited thereto. Rather, one or multiple output signals from the RF processing with one sub-array of antennas can be the inputs to the baseband processing. When multiple output signals from the RF processing with one sub-array of antennas are the inputs, each of the multiple output signals from the RF processing with one sub-array of antennas can be connected to part of or all of the antennas of the sub-array. For example, the RF and IF signal processing with each of the sub-array of antennas can be the same as the processing with the array of antennas as in FIG. 3C, or any type of the RF and IF signal processing with an array of antennas. The process related to one sub-array of the antennas can be referred to as one "RF processing chain".

In other embodiments, there can be other transmit and receive paths which are similar to the paths in FIGS. 3A through 3D, but with different beam forming structures. For example, the power amplifier 320 can be after the combiner 322, so the number of amplifiers can be reduced.

Figure 4:
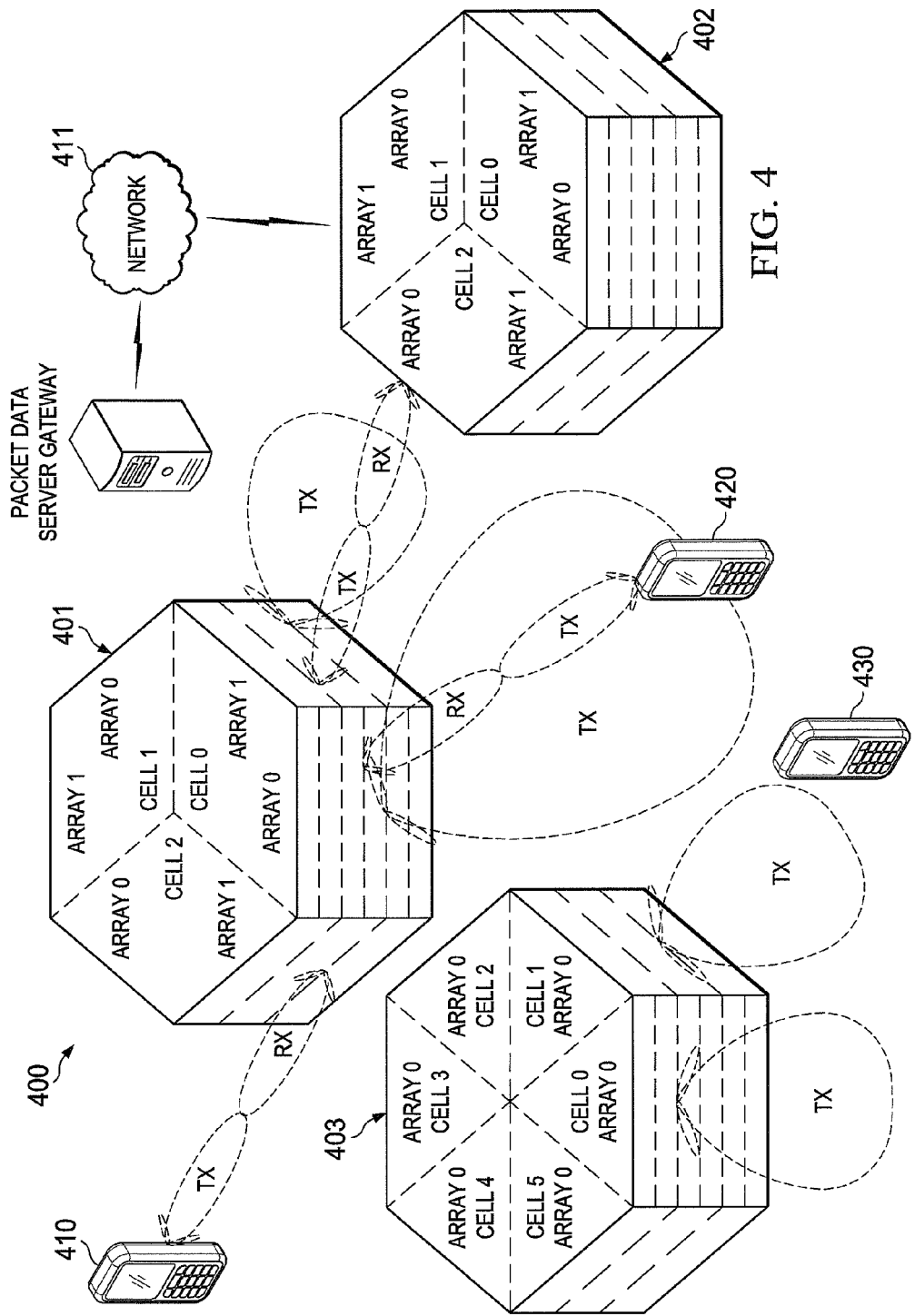
FIG. 4 illustrates a wireless communication system using antenna arrays, according to various embodiments of the present disclosure.

FIG. 4 illustrates a wireless communication system using antenna arrays, according to an embodiment of this disclosure. The embodiment of wireless communication system 400 illustrated in FIG. 4 is for illustration only. Other embodiments of the wireless communication system 400 could be used without departing from the scope of this disclosure.

As shown in FIG. 4, system 400 includes base stations 401-403 and mobile stations 410-430. Base stations 401-403 may represent one or more of base stations 101-103 of FIG. 1. Likewise, mobile stations 410-430 may represent one or more of mobile stations 111-116 of FIG. 1.

BS 401 includes three cells: cell 0, cell 1, and cell 2. Each cell includes two arrays, array 0 and array 1. In cell 0 of BS 401, antenna array 0 and array 1 may transmit the same downlink control channels on a wide beam. However, array 0 can have a different frame structure from array 1. For example, array 0 can receive uplink unicast communication from MS 420, while array 1 can transmit downlink backhaul communication with cell 2 array 0 of BS 402. BS 402 includes a wired backhaul connecting to one or more backhaul networks 411. A synchronization channel (SCH) and broadcast channel (BCH) can also be transmitted over multiple beams with a beam width not as wide as the widest transmission beam from BS 401 shown in FIG. 4. Each of these multiple beams for the SCH or BCH may have a beam width wider than beams for unicast data communication, which can be for communication between a base station and a single mobile station.

Throughout the disclosure, the transmit beams can be formed by a transmit path, such as shown in FIGS. 3A and 3B. Likewise, the receive beams can be formed by a receive path, such as shown in FIGS. 3C and 3D.

One or more of the wireless links illustrated in FIG. 4 may be broken due to an LOS blockage (e.g., objects such as people or cars move into the LOS) or a NLOS may not have rays strong enough to maintain the communication. Even if a MS is close to a BS and the MS only moves a short distance, the link may be broken. In such an event, the MS may need to switch links if the current link cannot be recovered. A MS may need to switch links even if the MS is not at the cell edge.

If each antenna in the arrays is not positioned at a high elevation, then TX or RX beams substantially covering a sphere can be used. For example, if each beam is shaped like a pencil, then at each sampling point of a 360-degree circle of azimuth search, a 180-degree elevation search may be needed. Alternatively, if each antenna is positioned at a high elevation, then at each sampling point of a 360-degree circle of azimuth search a less than 180-degree elevation search may be sufficient.

Throughout the disclosure, a beam can be referred as a projection or propagating stream of energy radiation. Beamforming can by performed by applying adjustment of phase shifter and other factors to concentrate radiated energy in certain directions to transmit or receive signals. The concentrated radiation is called a spatial beam. By changing the phase shifts applied (e.g., at phase shifters 318 or 364), different spatial beams can be formed. The beam may have an identifier to uniquely identify the beam among other beams that can be formed. The beams can be wide beams or narrow beams. The beam can be of any shape, e.g., a pencil-like beam, a cone-like beam, a beam with an irregular shape with uneven amplitude in three dimensions, etc. The beams can be for data communications or for control channel communications. The communication can be from a BS to a MS, from the MS to the BS, from a BS to another BS, or from an MS to another MS, etc.

FIG. 5A illustrates an example of beamforming capabilities of a transmitter 500 and a receiver 550 in accordance with an exemplary embodiment of the present disclosure. For example, the transmitter 500 may implement a transmit path analogous to the transmit path 300 in FIG. 3A or the transmit path 301 in FIG. 3B. The receiver 550 may implement a receive path analogous to the receive path 350 in FIG. 3C or the receive path 351 in FIG. 3D.

The RX antenna array 551 in the receiver 550 can form and steer beams. Some of the RX beams may not be used at the same time, but instead they can be used or steered at different times, e.g., sending beam 1 at a first time, then sending beam 2 at a second time right after the first time. These beamforming constraints may be due to capability limitations of the receiver 550. For example, there could be multiple RF processing chains, antenna sub-arrays, or panels facing different directions, such that in certain cases certain beams with certain directions can only be formed by one of the antenna sub-arrays, not from all the sub-arrays. In another example, one RF processing chain or antenna sub-array may only be capable of steering or forming one beam at a time. Thus, for simultaneous beamforming, the receiver 550 may need to use different RF processing chains or antenna sub-arrays for each RX beam needing to be formed simultaneously.

The RF beamforming capability on the beams, e.g., which beams cannot be formed or used at the same time, or which beams can be formed or used at the same time, etc., can be fed back to the transmitter 500. The transmitter 500 (or some scheduling controller or coordinator) may use one or multiple receivers beamforming capabilities as one of the factors to determine the transmission schemes, such as which transmitting (TX) beams should be used, whether to use single stream or multiple streams as the input at the transmitter, whether to use single user MIMO (multiple input multiple output) processing or multi-user MIMO processing, or whether to use multiple transmitting points or transmitters to communicate with the receiver 550, etc.

The transmitter 500 and the receiver 550 include multiple RF processing chains. One of the RF chains may include one or more antenna sub-arrays, which could be a subset of the entire antenna array.

As illustrated in FIG. 5A, RF chain 1 561 at the receiver 550 is capable of forming two RX beams, RX B1 and RX B2. In this example, RX B1 and RX B2 cannot be formed at the same time, because the antennas are part of the same RF chain 1 561. Rather, RX B1 and RX B2 can be used or steered at different times. RF chain 2 562 at the receiver 500 also has two RX beams, RX B3 and RX B4. Similarly, RX B3 and RX B4 cannot be formed at the same time; rather, RX B3 and RX B4 can be used or steered at different times. For the transmitter 500, RF chain 1 511 is capable of forming TX B1 and TX B2; however, TX B1 and TX B2 cannot be formed at the same time but can be steered at different times. Similarly, RF chain 2 512 is capable of forming TX B3 and TX B4; however, TX B3 and TX B4 cannot be formed at the same time but can be steered at different times.

In this illustrative example, by steering beams at the RX and TX sides, the receiver 550 identifies three possible links (or pairs of the TX and RX beams) that can be formed with the transmitter 500, i.e., (TX B2, RX B2), (TX B3, RX B1), and (TX B4, RX B3). Among the three pairs, (TX B2, RX B2) and (TX B3, RX B1) cannot be received by the receiver 550 at the same time because RX B1 and RX B2 cannot be formed at the same time. If the information streams (e.g., the input to the transmitter 500) are the same single stream, i.e., single stream communication, then each of the TX beams are transmitting the same information, and there may not be the need for the transmitter 501 to know the beamforming capability of the receiver 550, such as which RX beams cannot be formed at the same time. The transmitter 501 may choose the best TX and RX pairs simply from measurement report from the receiver 550.

If the information streams are different streams, i.e., multi-stream communication, some of the RF chains may transmit different information than other RF chains. For example, the RF chain 511 may transmit a first stream, and the RF chain 512 may transmit a second stream. In this example, the transmitter 500 may need to know the beamforming capabilities of the receiver 550, such as which RX beams cannot be formed at the same time. Since the receiver 550 cannot receive the pairs of (TX B2, RX B2) and (TX B3, RX B1) at the same time because RX B1 and RX B2 cannot be formed at the same time, the transmitter 500 may advantageously choose to use TX B2 to transmit stream 1 and TX B4 to stream 2. In this configuration, the receiver 550 can receive stream 1 on RX B2 using RF chain 561 while receiving stream 2 on RX B3 using RF chain 562. As a result, the transmitter 500 is informed of the beamforming constraints of the receiver 550, and the receiver 550 is able properly receive and process multiple streams of information simultaneously.

Figure 5B:
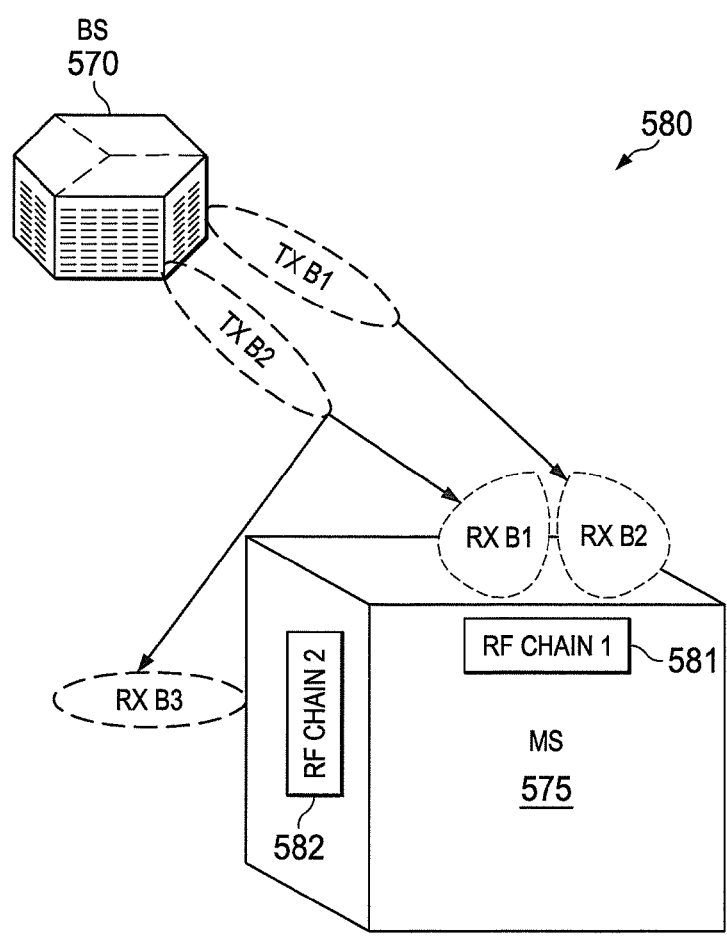
FIG. 5B illustrates an example of beamforming capabilities of a base station and a mobile station in a wireless communication system in accordance with an exemplary embodiment of the present disclosure.

FIG. 5B illustrates an example of beamforming capabilities of a BS 570 and a MS 575 in a wireless communication system 580 in accordance with an exemplary embodiment of the present disclosure. For example, the BS 570 may be an example of one embodiment of the transmitter 500 in FIG. 5A and the MS 575 may be an example of one embodiment of the receiver 550 in FIG. 5A.

In this illustrative embodiment, the position of the MS 575 relative to and the BS 570 may affect the RF beamforming capabilities of the MS 575 and/or the BS 570. For example, the position of the antenna sub-arrays or panels within the MS 575 may be facing different directions depending on the way the MS 575 is manufactured and/or the manner in which the MS 575 is positioned or held. In this illustrative example, the MS 575 has two different RF processing chains 581 and 582 that are located on different panels of the MS 575. Based on the conditions in the system 580 (e.g., channel conditions, presence of reflectors etc.) and the positioning of the MS 575 relative to the BS 570 in three dimensional space, certain beamforming constraints may be present. For example, as illustrated, MS 575 is capable of forming RX B1 to receive TX B2 and RX B2 to receive TX B1. However, the MS 575 cannot form RX B1 and RX B2 concurrently due to the physical constraints of being formed on a single RF processing chain 581. Using RF processing chain 2 582, the MS 575 is capable of forming RX B3 to receive TX B2. However, due to conditions in the system 580 (e.g., the location of RF processing chain 2 582 inside of the MS 575, the positioning of the MS 575 relative to the BS 570, channel conditions, etc.) the MS 575 may not be able to form or steer a beam to receive TX B1 from the BS 570 using RF processing chain 2 582. In this example, for two stream concurrent communication to occur, the pairs would have to be (TX B2, RX B3) and (TX B1, RX B2). In various embodiments, the MS 575 and/or the BS 570 identify these constraints on concurrent beamforming and use these constraints in determining the appropriate transmission scheme to use.

The beam management techniques described herein can be implemented in uplink and downlink communication embodiments between a BS and a MS. Additionally, although many exemplary embodiments describe communication between a BS and a MS, various embodiments are also applicable to communications between a BS and a BS, between a MS and a MS.

In one exemplary embodiment, the transmitter 500 (or the BS 570) may broadcast TX beams, e.g., reference signals that include an identifier implicitly or explicitly, so that the receiver 550 (or the MS 575) can identify the TX beams. The receiver 550 (or the MS 575) can index and indicate the RX beams, so that when the receiver 550 (or the MS 575) sends the capability information about the RX beams (e.g., which RX beams cannot be formed or used at the same time, etc.) to the base station or other network entity, for the base station and other network entity to understand which RX beams are mentioned. For a time division duplex (TDD) system, the TX beams can also be used for receiving, or the transmitting and receiving may be on the same beams (e.g., uplink and downlink communications may use the same beams, for example, in scenarios where the channel is reciprocal).

In various embodiments, the transmitter 500 (or the BS 570) and/or the receiver 550 (or the MS 575) perform measurement of the various RX and TX beams that can be steered in order to determine which pairs the TX and RX beams are capable of being used (e.g., having a signal to noise ratio (SNR) or signal to interference-noise ratio (SINR), etc. greater than some threshold, etc.). In one example, the transmitter 500 (or the BS 570) may use one of the TX beams carrying a beam identifier to transmit for a period of time during which the receiver 550 (or the MS 575) steers (and measures) different RX beams (e.g., exhausting all possible RX beams), then the transmitter 500 steers a second TX beam while the receiver 550 (or the MS 575) steers (and measures) the RX beams. This procedure can be repeated until all the TX beams are steered (and measured). In another example, the receiver 550 (or the MS 575) may use one RX beam to receive for a period of time while the transmitter 500 (or the BS 570) cycles through steering (and measuring) different TX beams (e.g., exhausting all the TX beams), then the receiver 550 (or the MS 575) steers a second RX beam while the transmitter 500 (or the BS 570) steers (and measures) the TX beams. The procedure can be repeated until all the RX beams are steered (and measured). In one exemplary embodiment, the RX beams at the MS can be partly used for cell monitoring, as well as the communication with the BS.

In one exemplary embodiment, the beamforming capability information of the MS may include the constraint on which beams (including RX beams or TX beams) may be able to be formed simultaneously. The MS may then feed back information about the beamforming capability to the transmitter 500 (or the BS 570). The BS or some other network entity may use the capability information of one or several MSs to determine scheduling and transmission schemes, such as, for example, which BS TX beams should be used, whether to use single stream or multiple streams as the input at the transmitter 500 (or the BS 570), whether to use single user MIMO processing or multi-user MIMO processing, whether to use multiple transmitting points or BSs to communicate with the receiver 550 (or the MS 575), etc. If the MS beamforming capabilities do not change dynamically or significantly over time, the MS may send the capability information to the BS or other network entity once. If the MS beamforming capabilities change more frequently, then the MS may send updates or reports more frequently when needed or send periodic updates or reports to the BS or other network entity.

Figure 6:
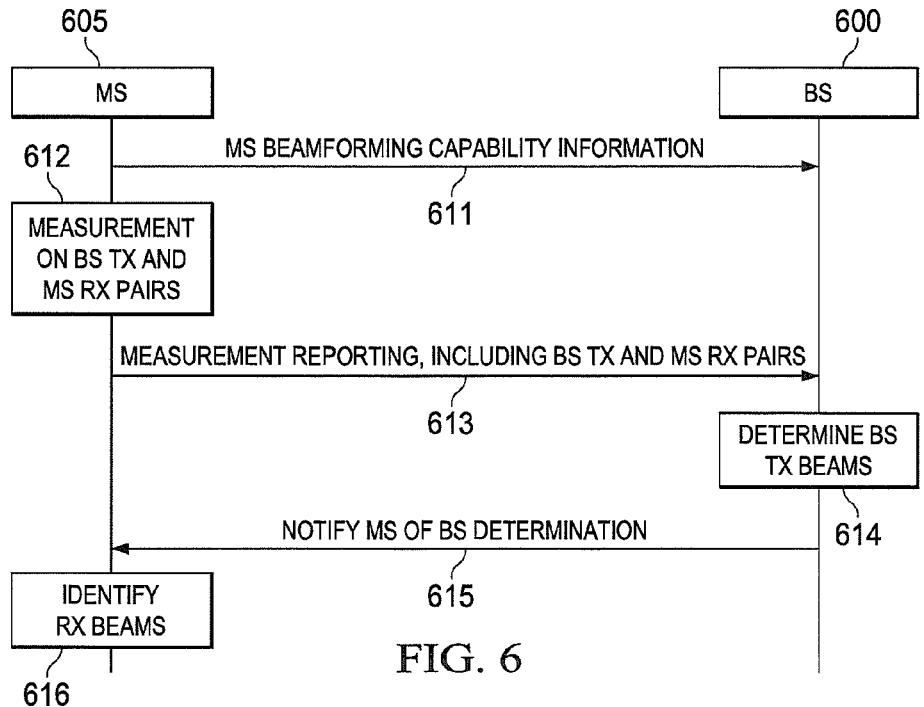
FIG. 6 illustrates a flow diagram of a process for beam management where a base station determines a transmission scheme based on measurement reporting and beamforming capability information received from a mobile station in accordance with an exemplary embodiment of the present disclosure.

FIG. 6 illustrates a flow diagram of a process for beam management where a BS 600 determines a transmission scheme based on measurement reporting and beamforming capability information received from a MS 605 in accordance with an exemplary embodiment of the present disclosure. In this exemplary embodiment, the MS 605 identifies and sends beamforming capability information of the MS 605 to the BS 600 or other network entity (step 611). The MS beamforming capability information can include information on RF beamforming constraints, e.g., which MS RX beams cannot be steered, formed, or used at the same time. The MS 605 then performs measurement on different BS TX and MS RX pairs that can be formed or steered (step 612). For example, the MS 605 may perform the measurement based on measurement configuration or instruction from the BS 600 or other network entity. The MS 605 may autonomously perform the measurements. The MS 605 sends the measurement report to the BS 600 (step 613). The measurement report may include the BS TX and MS RX beams pairs (e.g., indices or some other indicator of TX and RX beams) and the measurements corresponding to the pairs. The measurement metric may be, for example, SNR, SINR, signal to interference ratio (SIR), reference signal received power (RSRP), reference signal received quality (RSRQ), etc.

The BS 600 or other network entity determines the transmission schemes, such as which BS TX beams to use, whether to use single stream transmission or multiple stream transmission, or which transmission strategy to use for multiple stream transmission (e.g., how to associate the different streams with the different TX RF chains and beams, etc.). If the MS 605 is only capable of receiving one beam at one time, the BS 600 may choose to only send one information stream to the MS 605. If the BS 600 would send multiple streams to the MS, the multiple streams cannot be over multiple TX beams at the same time. Rather, they could be multiplexed in the time or frequency domain (not in the spatial (beam) domain due to the limited beamforming capability of the MS 605 to receive multiple independent beams).

If the MS 605 is capable of receiving multiple beams concurrently based on the indication of the beamforming capability of the MS 605, the BS 600 may choose to send multiple streams to the MS 605. If indeed the BS 600 plans to send multiple streams to the MS 605 at the same time over multiple beams, the BS 600 may choose the BS TX beams based on the beamforming capability of the MS 605 and the measurement on the beam pairs of BS TX and MS RX beams (step 614). For example, the BS 600 may ensure that the information streams are sent over so that the MS 605 can receive them at the same time over multiple RX beams.

For example, in the example illustrated in FIG. 5A, if the information streams (the input to the transmitter 500) are the different streams, i.e., multi-stream communication, some of the RF chains may transmit different information than the other chains, e.g., stream 1 can be delivered by the first TX RF chain 511, stream 2 can be delivered by the second TX RF chain 512. In this example, the transmitter 500 may need to know the beamforming capability of the receiver 550, such as which RX beams cannot be formed at the same time. Since (TX B2, RX B2) and (TX B3, RX B1) cannot be received by the receiver 550 at the same time because RX B1 and RX B2 cannot be formed at the same time, the transmitter 500 may choose TX B2 to transmit stream 1, and TX B4 to transmit stream 2, so that the receiver 550 can receive stream 1 via RX B2 while receiving stream 2 via RX B3.

When the BS 600 uses one stream communication to the MS 605, the BS 600 may not need to know the beamforming capability of the MS 605. The BS 600 may signal the MS 605 about the one stream communication. In this example, the MS 605 would know that the MS 605 does not need to send the MS beamforming capability information to the BS 600. In another example, if the MS 605 does not include the MS beamforming capability information, by default, the BS 600 may identify that the MS 605 cannot steer or use multiple beams at the same time (e.g., the MS 605 may only have one RF chain available for communication with the BS 600).

After BS 600 determines which TX beams to use, the BS 600 sends a notification of the determination to the MS 605 as control information (step 615). The notification may be formatted to include the TX beams to be used by the BS 600. Then the MS 605 may determine which RX beams to use based on which RX beams are capable of being paired with the determined TX beams (step 616). In another example, the BS 600 can send an indication of the recommended MS RX beams corresponding to the determined TX beams so that the MS 605 can use the preferred RX beams to receive the stream transmitted on the TX beams used by the BS 600.

In these embodiments, the MS beamforming capability information may be formatted in a number of different manners. For example, the MS beamforming capability information may be in the format of the relationship between RF chains and RX beams (e.g., the information about the RX beams and their associated RF chains). This information may be coded to reduce associated signaling overhead. In one example, the MS beamforming capability information may include RF chain 1, RX beam identifier (ID) 1, 2, 3; RF chain 2, RX beam ID 4, 5, 6. In another example, the MS beamforming capability information may include RF chain 1, RX beam ID 1-3 (i.e., consecutive beam IDs, starting beam ID 1, ending beam ID 3); RF chain 2, RX beam ID 4-6 (i.e., consecutive beam IDs, starting beam ID 4, ending beam ID 6). In another example, the ending beam ID may be replaced with the number of beam IDs associated with the RF chain (e.g., starting beam ID to N number of consecutive beam IDs. In yet another example, the RX beam ID may have two elements. The first element indicates the RF chain index, the second element indicates the beam index within the RF chain, e.g., RX beam ID (1,1), (1,2), (1,3), (2,1), (2,2), (2,3). In yet another example, if each RF chain has the same number (N) of the IDs, then the MS 605 may send the information on the number (N) of the beams IDs associate with each RF chain. Then the BS 600 and other network entity would understand that the RX beam IDs from (i−1)*N+1 to i*N are with RF chain i. TABLE 1, below, indicates examples of indicating the RX beams and their associated RF chains.

TABLE 1

| | |
|---|---|
| Number of RF chains | 2 |
| RF chain 1 | RX beam 1, 2, 3 |
| RF chain 2 | RX beam 4, 5, 6 |
| Number of RF chains | 2 |
| RF chain 1 | Consecutive beam IDs starting from 1, ending with 3 |
| RF chain 2 | Consecutive beam IDs starting from 4, ending with 6 |

Although this example shows each RF processing chain having a disjointed set of RX beams or disjointed set of RX beam identifiers, i.e., each RF chain has different RX beams from the other RF chains, all the embodiments in this disclosure are applicable to when the RF processing chains can have sets of RX beams where the sets can have some common elements (i.e., common RX beams). For example, RF chain 1 can form RX beams RX B1, B2, B3, and RF chain 2 can form RX beams RX B1, B4, B5, where RX B1 can be formed by either RF chain 1 or RF chain 2.

In some embodiments, the MS 605 may notify the BS 600 and/or other network entity that some beams cannot be steered, formed, or used at the same time. The MS 605 may send such information in a separate message or include this in the measurement report. TABLE 2, below, indicates examples of indicating the RX beams that cannot be steered, formed, or used at the same time.

TABLE 2

| Sets of the Beams where the beams in the same set cannot be formed at the same time | RX beam set 1 (1, 2, 3) RX beam set 2 (4, 5, 6) RX beam set 3 (7, 8, 9) |
|---|---|

The BS 600 or other network entity also receives the pairs of the BS TX beam and MS RX beam and the measurement. The BS 600 identifies, from these reports, which TX beams with different information streams at the same time which are intended to be received by RX beams in the same set.

Figure 7:
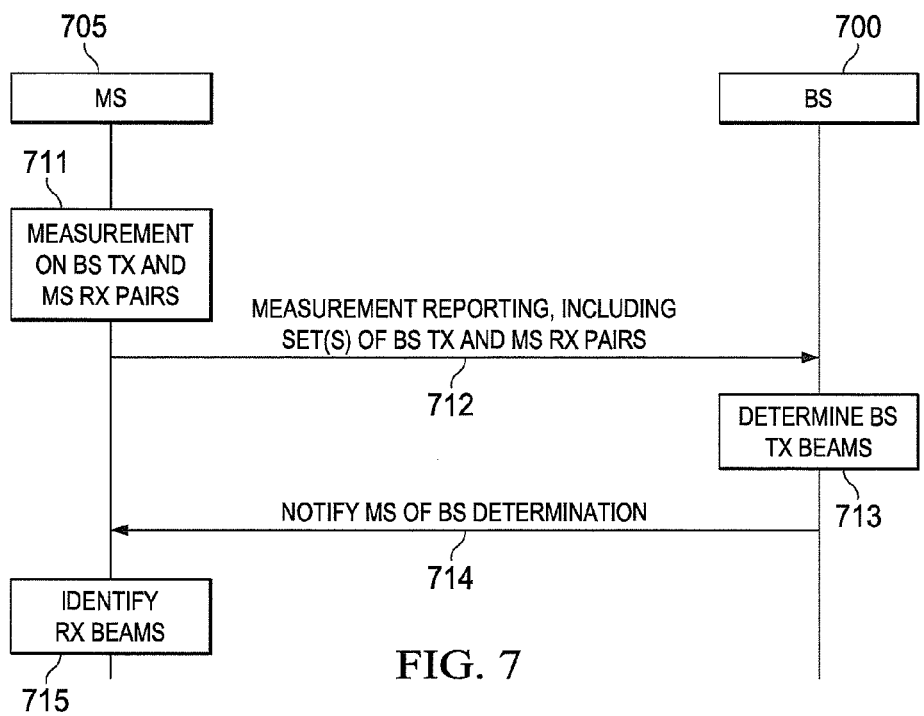
FIG. 7 illustrates a flow diagram of a process for beam management where a base station determines a transmission scheme based on measurement reporting including possible sets of base station transmit beam and mobile station receive beam pairs received from a mobile station in accordance with an exemplary embodiment of the present disclosure.

FIG. 7 illustrates a flow diagram of a process for beam management where a BS 700 determines a transmission scheme based on measurement reporting including possible set(s) of BS TX and MS RX pairs received from a MS 705 in accordance with an exemplary embodiment of the present disclosure. In this exemplary embodiment, the MS 705 performs measurements on BS TX and MS RX pairs (step 711). The MS 705 sends a measurement report to the BS 700 or another network entity (step 712). The measurement report may include the possible set(s) of BS TX and MS RX pairs, where the pairs within the set are those pairs whose RX beams can be concurrently used.

The BS 700 or other network entity determines transmission schemes (step 713), such as which BS TX beams to use, whether to use single stream transmission or multiple stream transmission, which transmission strategy to use for multiple stream transmission (e.g., how to associate multiple streams with multiple TX RF chains, etc.). The BS 700 or other network entity may make the determination based on the measurement reporting, the list of the possible set(s) of the BS TX and MS RX pairs where the pairs within the set(s) are those pairs whose RX beams can be concurrently used, and/or the BS TX capability on the TX beams (e.g., which TX beams cannot be steered, formed, or used at the same time due to beamforming constraints of the BS 700). For example, if the MS 705 reports two good pairs within one set reported, then the BS 700 determines that it is possible to deliver two streams to the MS 705 at the same time.

In the example illustrated in FIG. 5A, the measurement and steering finds three good pairs, i.e., (TX B2, RX B2), (TX B3, RX B1), and (TX B4, RX B3). The measurement report sent by the MS 705 may include the following sets: set 1 including beam pairs (TX B2, RX B2), (TX B4, RX B3); and set 2 including beam pairs (TX B3, RX B1), (TX B4, RX B3). In the same set, all the RX beams can possibly be used at the same time, or, more specifically, the receiver 550 has the capability to use these RX beams at the same time.

When the BS 700 or other network entity receives the measurement report, the BS 700 may further consider the beam pairs to determine the beamforming capability of the transmitter 500 with respect to the reported pair sets. For example, in the example illustrated in FIG. 5A, the two pairs in set 2 cannot be chosen, because TX B3 and TX B4 are both formed or steered by the same RF chain (RF chain 512) and cannot be formed or steered at the same time. However, the TX beams of the pairs in Set 1 can be formed at the same time. Accordingly, the BS 700 is capable of sending two streams over the beams in Set 1.

After BS 700 determines which TX beams to use, the BS 700 sends a notification of the determination to the MS 705 (step 714). For example, the notification may be formatted to include the TX beams to be used by the BS 700. Then the MS 705 may determine which RX beams to use based on which RX beams are capable of being paired with the determined TX beams (step 715). In another example, the BS 700 may send an indication of the recommended MS RX beams corresponding to the determined TX beams so that the MS 705 can use the preferred RX beams to receive the streams transmitted on the TX beams used by the BS 700.

In the measurement reporting, the MS 705 informs the BS 700 and/or other network entity about all the sets of possible BS TX and MS RX pairs that include only those MS RX beams which can be steered or formed at the same time. In other words, the MS 705 may not include measurement information for BS TX and MS RX pairs where the MS 705 cannot steer the RX beams at the same time. In this manner, the amount of signaling overhead may be reduced using this identification of the possible BS TX and MS RX pairs based on the beamforming constraints of the MS 705.

In terms of formatting this measurement reporting, the MS 705 may form the set starting from the set with the largest number of elements, then continue with the other sets with the number of elements in an non-increasing order. The MS 705 may not need to include any subset of these already formed sets. This can reduce the overhead of signaling. Of course, if the MS 705 includes the entire subset, the BS 700 may still be able to process the feedback but the message size of the feedback will increase. For example, if the MS 705 includes those pairs that are in the sets suitable for multiple stream communication, these pairs are not required to be sent again in the sets for pairs suitable for single stream communication, because all the pairs in the sets suitable for multiple streams communication should also be suitable for single stream communication. TABLE 3, below, provides an example of the beam reporting in the measurement report that may be feedback by the MS 705.

TABLE 3

| Sets of beam pairs that MS reports to the BS or other network entity, where the RX beams in the same set can be formed at the same time | Set 1: beam pairs (TX B2, RX B2), (TX B4, RX B3). Set 2: beam pairs (TX B3, RX B1), (TX B4, RX B3). |
|---|---|

In some embodiments, the MS 705 may use information about the beamforming capability of the BS 700 to further reduce the amount of information feedback the BS 700. For example, the BS 700 or other network entity informs the MS 705 about the BS beamforming capability for TX beams, such as which beams can or cannot be formed, steered, or used at the same time. Then, in the MS measurement reporting, the MS 705 can further screen and only report those beam pairs whose RX beams can be used at the same time and TX beams can be used at the same time. In these embodiments, the MS 705 may inform the BS 700 and/or other network entity of all the possible sets of BS TX and MS RX pairs, where each possible set only includes those BS TX and MS RX beam pairs which can be steered or formed at the same time.

In the example illustrated in FIG. 5A, the MS 705 removes set 2 from TABLE 3 above due to knowledge of the beamforming capability of the transmitter 500 and only reports set 1 if two stream communication is being used. However, if the MS 705 is unaware of whether there would be one stream communication or multiple stream communication, the MS 705 may include those pairs that may be suitable for single stream communication. If those pairs are already included in the sets suitable for multiple stream communication, the MS 705 is not required to send these pairs again in the sets for pairs suitable for single stream communication, because all the pairs in the sets suitable for multiple stream communication should also be suitable for single stream communication.

Hence, the MS 705 should include the pair (TX B3, RX B1) in the report for the possibility of single stream communication. The MS 705 does not need to include the pair (TX B4, RX B3) in the report for the possibility of single stream communication since the pair has been included in set 1. TABLE 4, below, provides an example of beam pair reporting for including the possibility of single stream communications.

One of the advantages of having MS report the beam pairs is that the BS can have more information to determine which RX beams of the MS can be used for monitoring the neighboring cells and which RX beams of the MS can be used for data communication with the said BS.

TABLE 4

| Sets of beam pairs that MS reports to the BS or other network entity, where the beams in the same set can be formed at the same time | Set 1: beam pairs (TX B2, RX B2), (TX B4, RX B3). Set 2: (TX B3, RX B1) |
|---|---|

Figure 8:
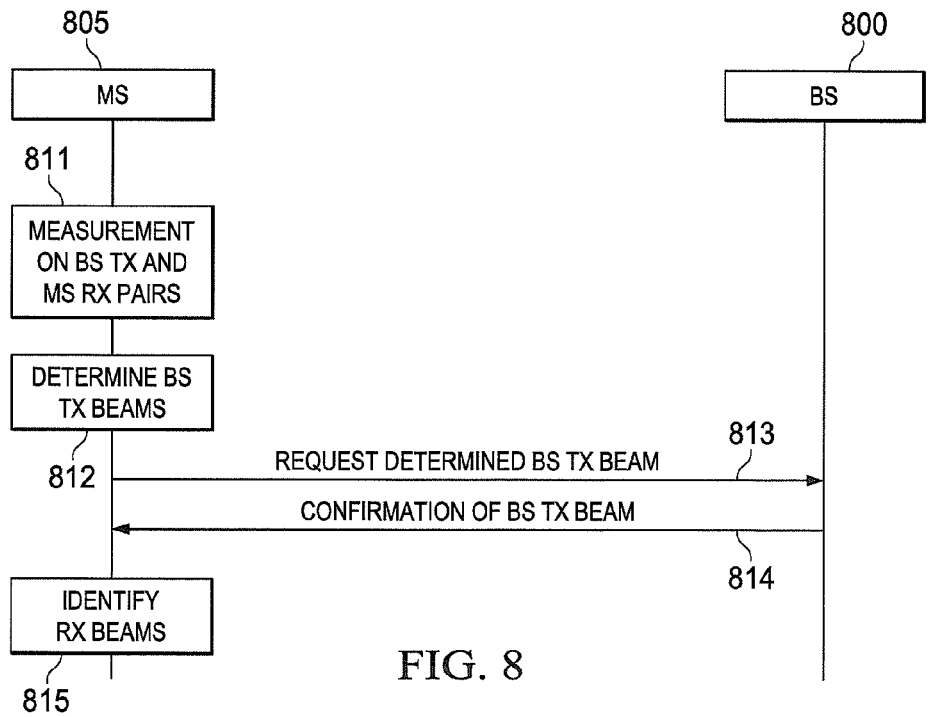
FIG. 8 illustrates a flow diagram of a process for beam management where a mobile station determines and requests a preferred transmission scheme in accordance with an exemplary embodiment of the present disclosure.

FIG. 8 illustrates a flow diagram of a process for beam management where a MS 805 determines and requests a preferred transmission scheme in accordance with an exemplary embodiment of the present disclosure. In this illustrative embodiment, the MS 805 performs measurement on BS TX and MS RX pairs (step 811). The MS 805 determines which BS TX beams the MS 805 prefers (step 812). The MS 805 may form this determination based on the measurement of the pairs and the MS beamforming capability limitations. The MS 805 requests the determined BS TX beams (step 813). When the BS 800 or other network entity receives the request, the BS 800 and/or other network entity determines the capability of the transmitter 500 to transmit on the requested TX beams. The BS 800 then confirms to the MS 805 whether the requested BS TX beams will be used (step 814). The MS 805 may also indicate to the BS 800 how many data streams the MS 805 would prefer, for example as part of the request in step 813 or in a separate request. Thereafter, the MS 805 identifies the RX beams to use in communication with the BS 800 in response to the confirmation message from the BS 800 (step 815).

In these embodiments, the MS 805 may inform the BS 800 and/or other network entity about all the sets of possible BS TX beams of the BS TX and MS RX pairs, where each set includes only those BS TX beams of the BS TX and MS RX pairs where the MS RX beams are those that can be steered or formed at the same time. In this manner, the amount of signaling overhead associated with beam selection is reduced due to the fact that the MS 805 may only indicate the BS TX beams as opposed to indicating BS TX and MS RX pairs.

In one example, the MS 805 may format the set starting from the set with the largest number of elements then continue with the other sets with the number of elements in a non-increasing order. The MS 805 may not need to include any subset of these already formed sets. This configuration may significantly reduce signaling overhead associated with beam selection. Of course, if the MS 805 includes the entire subset, the BS 800 may still be able to process the feedback, but the message size of the feedback will increase. For example, if those pairs are already included in the sets suitable for multiple stream communication, these pairs are not required to be sent again in the sets for pairs suitable for single stream communication, because all the pairs in the sets suitable for multiple stream communication should also be suitable for single stream communication. TABLE 5, below, provides an example of BS TX beam reporting for including the possibility of single stream communications.

TABLE 5

| Sets of possible BS TX beams of the BS TX and MS RX pairs, where each set includes only those BS TX beams of the BS TX and MS RX pairs where MS RX beams are those can be steered or formed at the same time | Set 1: TX beams TX B2, TX B4. Set 2: TX beams TX B3, TX B4 |
|---|---|

As part of the BS TX beam reporting, the MS 805 may also include the associated measurement reporting.

In these embodiments, the MS 805 may instead report codewords or the codeword indices in a codebook to indicate the preferred transmission scheme. The codeword can be from the codebook for the RF beamforming or the analog beamforming.

In some embodiments, the MS 805 may use information about the beamforming capability of the BS 800 to further reduce the amount of information feedback to the BS 800. For example, the BS 800 or other network entity informs the MS 805 about the BS beamforming capability for TX beams, such as which beams can or cannot be formed, steered, or used at the same time. Then, in the BS TX beam request, the MS 805 can further screen and only report those BS TX beams whose RX beams can be used at the same time and TX beams can be used at the same time. In these embodiments, the MS 805 may inform the BS 800 and/or other network entity of all the possible sets of BS TX beams, where each possible set only includes those BS TX and MS RX beam pairs which can be steered or formed at the same time.

In the example illustrated in FIG. 5A, the MS 805 removes set 2 from TABLE 5 above due to knowledge of the beamforming capability of the transmitter 500 and only reports set 1, if two stream communication is being used. However, if the MS 805 is unaware of whether there would be one stream communication or multiple stream communication, the MS 805 may include those BS TX beams that may be suitable for single stream communication. If those BS TX beams are already included in the sets suitable for multiple streams communication, the MS 805 is not required to send these BS TX beams again in the sets for BS TX beams suitable for single stream communication, because all the BS TX beams in the sets suitable for multiple stream communication should also be suitable for single stream communication.

Hence, the MS 805 should include the BS TX beam (TX B3) in the report for the possibility of single stream communication. The MS 805 does not need to include the BS TX beam (TX B4) in the report for the possibility of single stream communication since the BS TX beam has been included in set 1. TABLE 6, below, provides an example of beam pair reporting including the possibility of single stream communications.

TABLE 6

| Sets of possible BS TX beams of the BS TX and MS RX pairs, where each set includes only those BS TX beams of the BS TX and MS RX pairs where both BS TX and MS RX beams are those can be steered or formed at the same time | Set 1: TX beams TX B2, TX B4.<br>Set 2: TX beam TX B3 |
|---|---|

In these embodiments, the MS 805 may instead report codewords or the codeword indices in a codebook to indicate the preferred transmission scheme. The codeword can be from the codebook for the RF beamforming or the analog beamforming.

Figure 9:
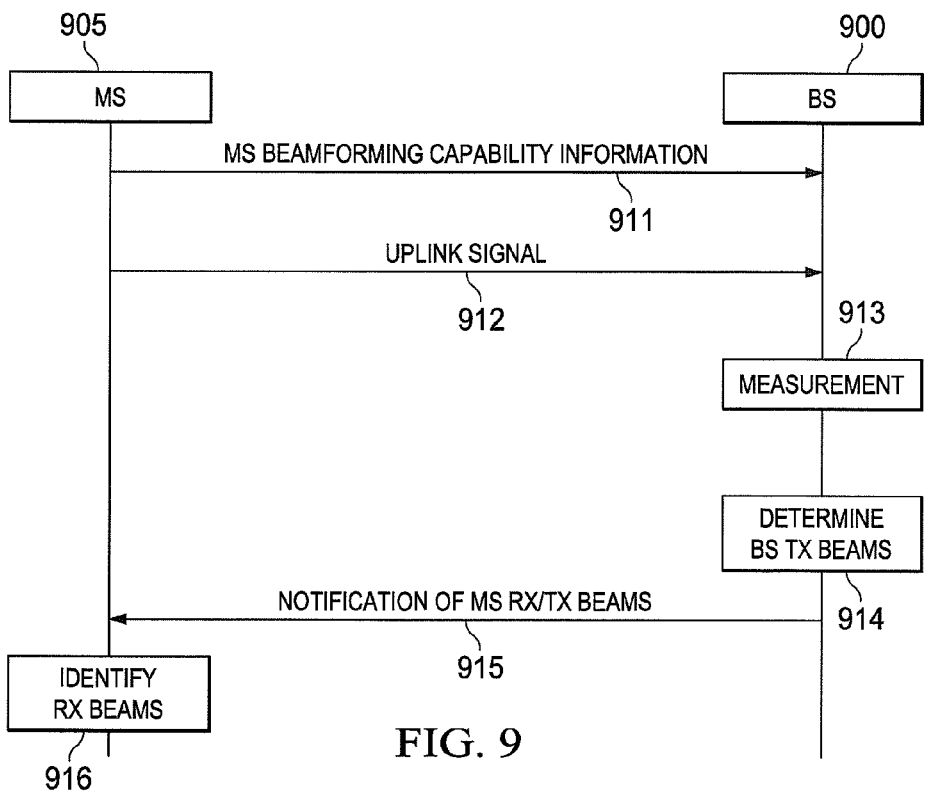
FIG. 9 illustrates a flow diagram of a process for beam management where a base station uses an uplink signal to measure beam pairs and determine a transmission scheme based on beamforming capability information of a mobile station in accordance with an exemplary embodiment of the present disclosure.

FIG. 9 illustrates a flow diagram of a process for beam management where a BS 900 uses an uplink signal to measure beam pairs and determines a transmission scheme based on beamforming capability information of a MS 905 in accordance with an exemplary embodiment of the present disclosure. In this illustrative embodiment, the MS 905 sends MS beamforming capability information to the BS 900 or other network entity (step 911). The MS beamforming capability information may include information on beamforming constraints, e.g., which MS beams cannot be steered, formed, or used at the same time. The MS 905 transmits an uplink signal for measurement by the BS 900, e.g., a reference signal (step 912). The BS 900 performs an uplink measurement (step 913). For example, the MS 905 may use the same beams for transmitting and receiving, i.e., the TX and RX beams of the MS 905 may be the same e.g., in a time division multiplexing communication system or a communication system where the channel is reciprocal. The BS 900 or other network entity determines which BS TX beams to use (step 914). The determination may be based on the measurement results, the MS beamforming capability limitations on concurrent beams if there are multiple streams to deliver to the MS, and the BS beamforming capability limitations. The BS 900 then notifies the MS 905 about which MS RX beams are to be used to receive future communications (step 915). Thereafter, the MS 905 identifies the RX beams to use in communication with the BS 900 in response to the notification message from the BS 900 (step 916). In some embodiments, if the MS 905 also performs downlink measurement, then the BS 900 may notify the MS 905 about the BS TX beams to be used. Then the MS 905 can determine which RX beams to be used based on the measurement done by the MS 905.

In some embodiments, MS 905 may request which RF chains or which MS beams the MS 905 should use for communications. These RF chains or beams that the MS 905 uses can be a subset of the total RF chains or total beams at the MS receiver.

Figure 10:
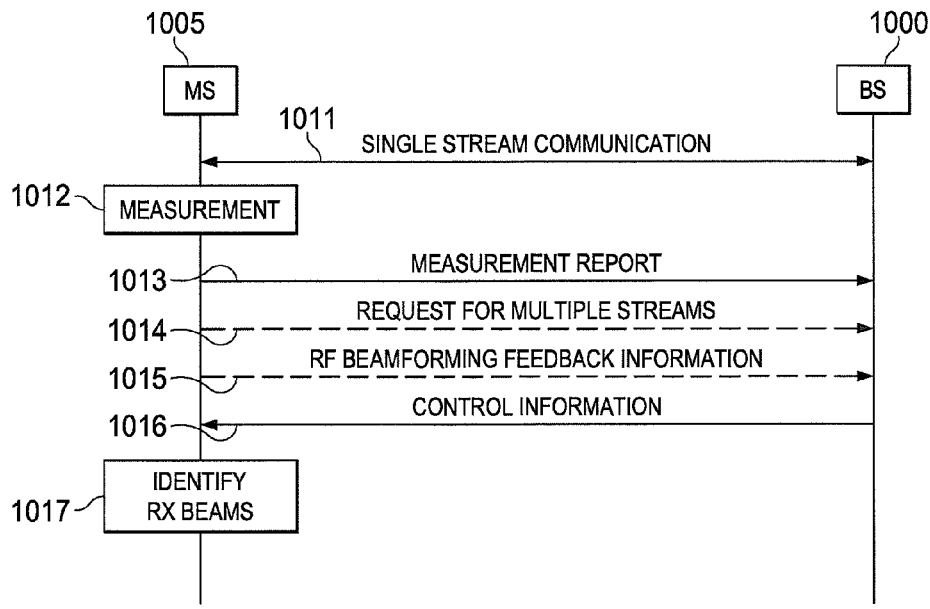
FIG. 10 illustrates a flow diagram of a process for beam management where a mobile station dynamically notifies a base station about the beamforming capabilities of the mobile station in accordance with an exemplary embodiment of the present disclosure.

FIG. 10 illustrates a flow diagram of a process for beam management where a MS 1005 dynamically notifies a BS 1000 about the beamforming capabilities of the MS 1005 in accordance with an exemplary embodiment of the present disclosure. In this illustrative embodiment, the BS 1000 can use the MS beamforming capability information and measurement to determine whether to use multiple stream communications in parallel or use different transmission schemes, such as a single stream over one link, a single stream over multiple links, or multiple streams, etc. For single point communication, if the BS 1000 has multiple streams which can be transmitted in parallel to the MS 1005, the BS 1000 or other network entity can use the information of which beams of the MS 1005 cannot receive the TX beams at the same time, e.g., due to the physical limitations of the MS 1005 as these beams are from a single RF chain.

In these embodiments, the communication can start with single stream communication (step 1011) as the MS 1005 and BS 1000 can both be assumed to each have at least one RF processing chain. Thereafter, the MS 1005 performs measurements (step 1012) and measurement reporting (step 1013) according to single stream communication standards. The MS 1005 may then, at some point, determine that multiple stream communication is desired, for example, based on changing abilities due to network conditions or a desire for faster communication speeds. The MS 1005 requests multiple stream communication (step 1014) and sends the appropriate RF beamforming feedback information (step 1015). The RF beamforming feedback information may include the measurement reporting, the MS beamforming capability information, possible sets of BS TX beam and MS RX beam pairs, requests for a desired transmission scheme, and/or requests for BS TX beams as described in any of the various beam management embodiments above. The BS 1000 sends control information to the MS 1005 indicating or confirming the transmission scheme to be used for the multiple steam communication. For example, this control information may include BS TX beam and MS RX beam pairs, BS TX beams, MS RX beam pairs, or a confirmation of the MS requested transmission scheme. Prior to sending the control information, the BS 1000 or other network entity may determine the transmission scheme or confirm the MS requested transmission scheme. Thereafter, the MS 1005 identifies the RX beams to use in communication with the BS 1000 in response to the control message from the BS 1000 (step 1017).

In some embodiments, the beams may not be steered, formed, or used at the same time can be due to different reasons. The MS 1005 may send these beams in different categories. The different reasons may include, for example, without limitation, the beams are formed or steered by a same RF chain where the RF chain can only form one independent beam at one time or that the beams are interfering with each other. The BS 1000 or other network entity can treat the sets of the beams where the beams in the same set cannot be formed at the same time, differently based on the reasons. For example, if the reason is due to a physical limitation such as an RF chain, then the BS 1000 or other network entity would not use those beams in the same set or would not transmit beams which can be intended to be received by those beams in the same set. If the reason is due to interference, then the BS 1000 or other network entity may still use those beams in the same set, based on interference levels, etc.

Figure 11A:
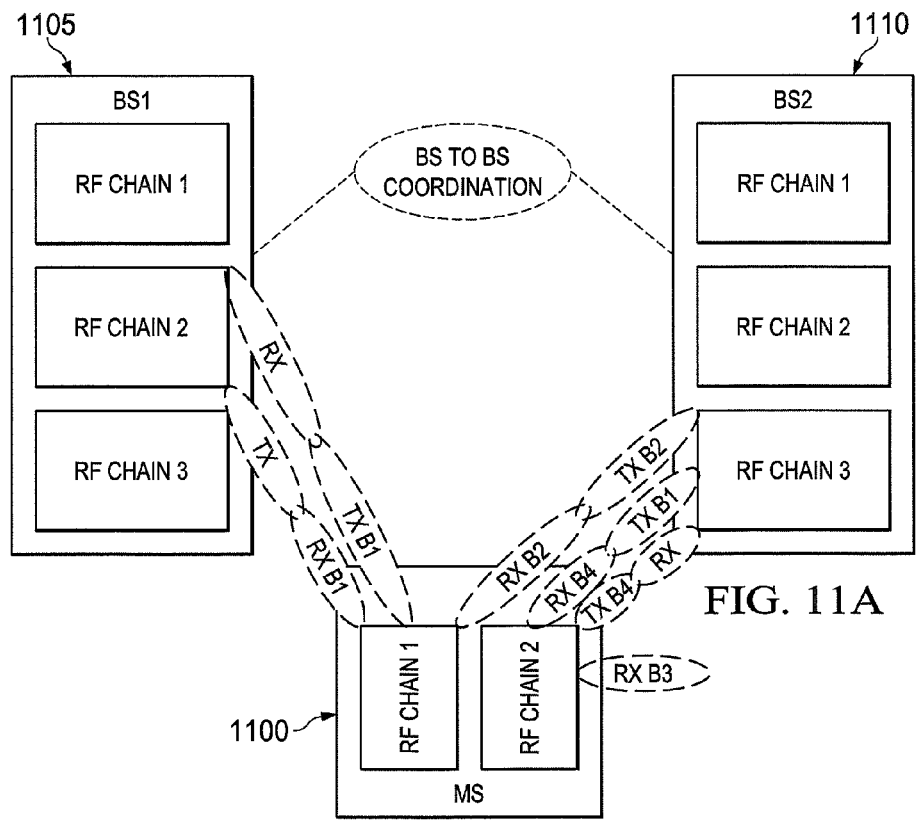
FIG. 11A illustrates an example of a mobile station concurrently connected to multiple base stations using multiple RF chains in accordance with an exemplary embodiment of the present disclosure.

FIG. 11A illustrates an example of a MS 1100 concurrently connected to multiple BSs 1105 and 1110 using multiple RF chains in accordance with an exemplary embodiment of the present disclosure. In this illustrative embodiment, the MS 1100 can concurrently connect to multiple base stations 1105 and 1110, for example, according to coordinated multipoint (CoMP) communication principals. The embodiment is also applicable if the MS is replaced by any node of another network entity, e.g., a base station.

In this exemplary embodiment, the BSs 1105 and 1110 may need to know which beam is being formed using which RF chain, so that a joint resource allocation can be performed. In the illustrated example, the MS 1100 steers RX beams, RX B1 and RX B2 from RF chain 1 and RX B3 and RX B4 from RF chain 2. The BSs 1105 and 1110 may need to know that RX B1, RX B2 are from RF chain 1 and RX B3 and RX B4 are from RF chain 2. For base station coordination, a first BS 1105 can choose the BS TX and MS RX beam pairs where the MS RX beams are from a different MS RF chain which can be used by a second BS 1110. For instance, BS1 1105 can choose the pair of BS1 TX and RX B1, while BS2 1110 can choose the pair of BS2 TX B1 and RX B4. In some examples, the BS2 1110 may not choose the pair of BS2 TX B2 and MS RX B2 even if the pair has good signal strength, because MS RX B2 is from another RF chain that BS1 1105 is communicating with. If indeed the BS2 1110 uses BS2 TX B2 and MS RX B2, the MS 1100 has to share the RX beams of RF chain 1 to communicate to both the BS1 1105 and the BS2 1110. In this example, time or frequency domain multiplexing should be used.

Figure 11B:
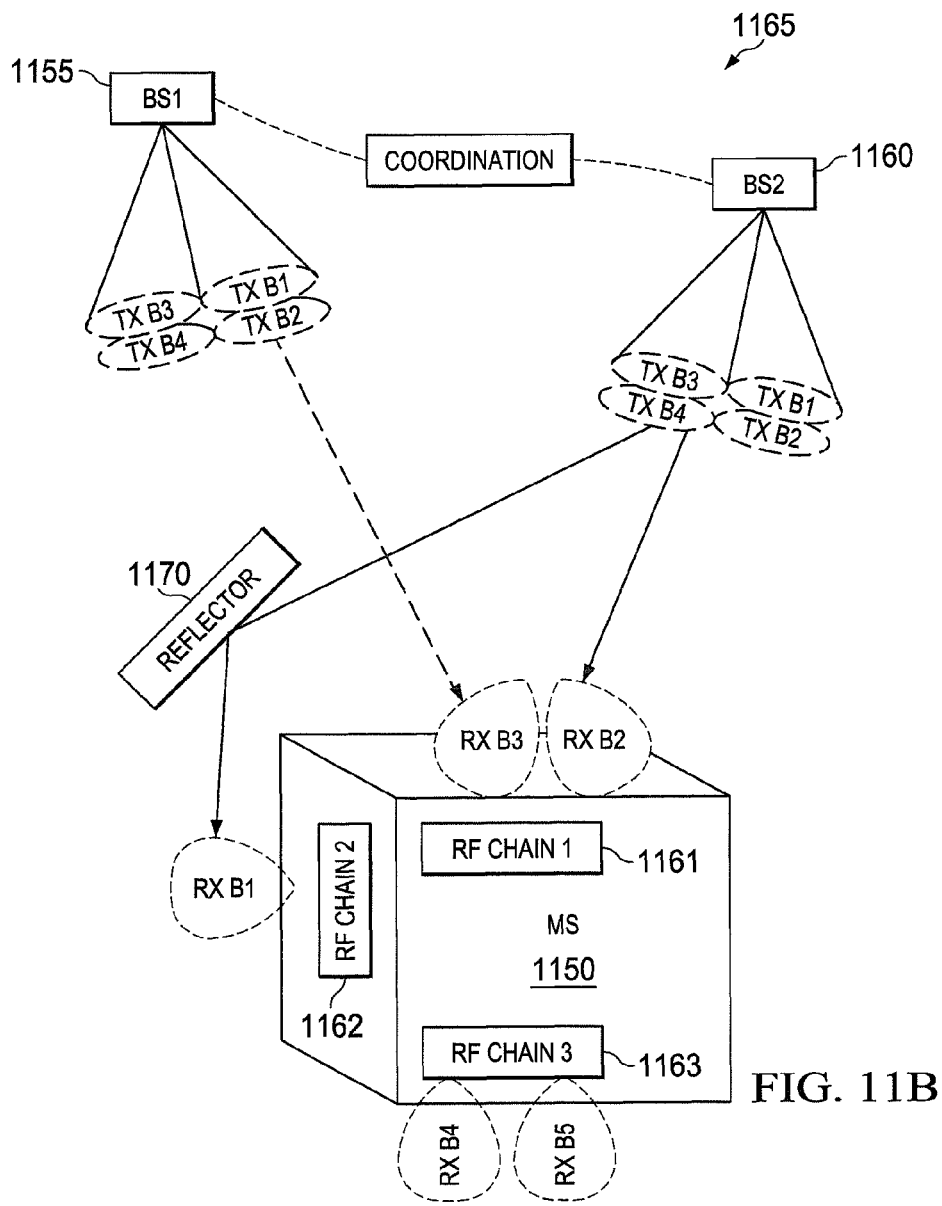
FIG. 11B illustrates another example of a mobile station concurrently connected to multiple base stations using multiple RF chains in a wireless communication system in accordance with an exemplary embodiment of the present disclosure.

FIG. 11B illustrates an example of a MS 1150 concurrently connected to multiple BSs 1155 and 1160 using multiple RF chains in a wireless communication system 1165 in accordance with an exemplary embodiment of the present disclosure. In this illustrative embodiment, the MS 1150 can concurrently connect to multiple base stations 1155 and 1160, for example, according to CoMP communication principals.

In this illustrative embodiment, the position of the MS 1150 relative to and the BSs 1155 and 1160 may affect the RF beamforming capabilities of the MS 1150 and/or the BSs 1155 and 1160. For example, the position of the antenna sub-arrays or panels within the MS 1150 may be facing different directions depending on the way the MS 1150 is manufactured and/or the manner in which the MS 1150 is positioned or held. In this illustrative example, the MS 1150 has three different RF processing chains 1161, 1162, and 1163 that are located on different panels of the MS 1150. Based on the conditions in the system 1165 (e.g., channel conditions, presence of reflectors (e.g., reflector 1170), etc.) and the positioning of the MS 1150 relative to the BSs 1155 and 1160 in three dimensional space, certain beamforming constraints may be present. For example, as illustrated, the MS 1150 cannot form RX B2 and RX B3 concurrently due to the limitation of the RF processing chain 1 1161, but RX beams at different RF chains (e.g., RX B1 and RX B3 or RX B1 and RX B2) may be formed concurrently. In this example, for concurrent communication between MS 1150 and BSs 1155 and 1160, (BS1 TX B1, MS RX B3) and (BS2 TX B4, MS RX B1) may be used. For non-concurrent communication, (BS1 TX B1, MS RX B3), (BS2 TX B4, MS RX B2) may be used for the MS 1150 to use one RF processing chain 1 161 and (BS 1 TX B1, MS RX B3) and (BS2 TX B4, MS RX B1) may be used for the MS 1150 to use two RF processing chains 1161 and 1162. In various embodiments, the MS 1150 and/or the BSs 1155 and 1160 identify these constraints on concurrent beamforming and use these constraints in determining the appropriate transmission scheme to use.

While FIGS. 11A and 11B illustrate embodiments where the MS 1100 (or MS 1150) communicates with multiple BSs 1105 and 1110 (or BSs 1155 and 1160), these embodiments can also be implemented in any node of another network entity, e.g., a BS communicating with multiple BSs 1105 and 1110 (or BSs 1155 and 1160). These embodiments may also be implemented where a BS or MS communicates with multiple mobile stations or multiple base station systems.

The beam selection management techniques outlined in the embodiments described above can all be applied to embodiments where the multiple streams come from separate physical devices, e.g., CoMP, as further illustrated by FIGS. 12-15 below.

Figure 12:
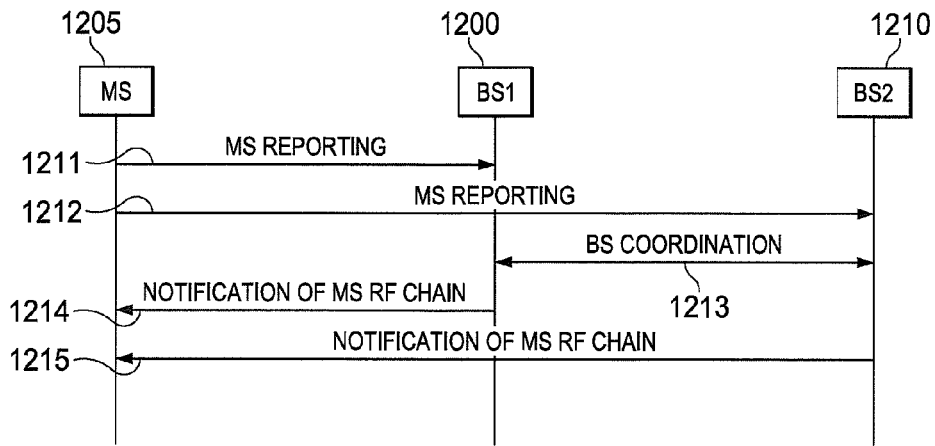
FIG. 12 illustrates a flow diagram of a process for beam management where base stations coordinate to determine based on measurement reporting and beamforming capability information received from a mobile station in accordance with an exemplary embodiment of the present disclosure.

FIG. 12 illustrates a flow diagram of a process for beam management where BSs 1200 and 1210 coordinate to determine based on measurement reporting and beamforming capability information received from a MS 1205 in accordance with an exemplary embodiment of the present disclosure. In this illustrative embodiment, the MS 1205 reports beamforming capability information to the BS1 1200 (step 1211) and the BS2 (step 1212). The MS 1205 may include an indication of BS TX beam and MS RX beam pairs, associated measurements, and the number of RF chains in the receiver 550. The BSs 1200 and 1210 perform coordination to determine the transmission scheme for the multi-point communication (step 1213) and separately inform the MS 1205 of the RF chain to be used for communication with the respective BS (steps 1214 and 1215). The MS 1205 may then form the RX beams based on the indicated RF chains. The process illustrated may also be performed as described above regarding FIG. 6 as applied to multi-point communication.

If the relationship between RF chain and the RX beams is relatively constant, the MS 1205 may only send this relationship information to the network entity once. If the relationship between RF chain and the RX beams varies, then the MS 1205 updates this information periodically.

Figure 13:
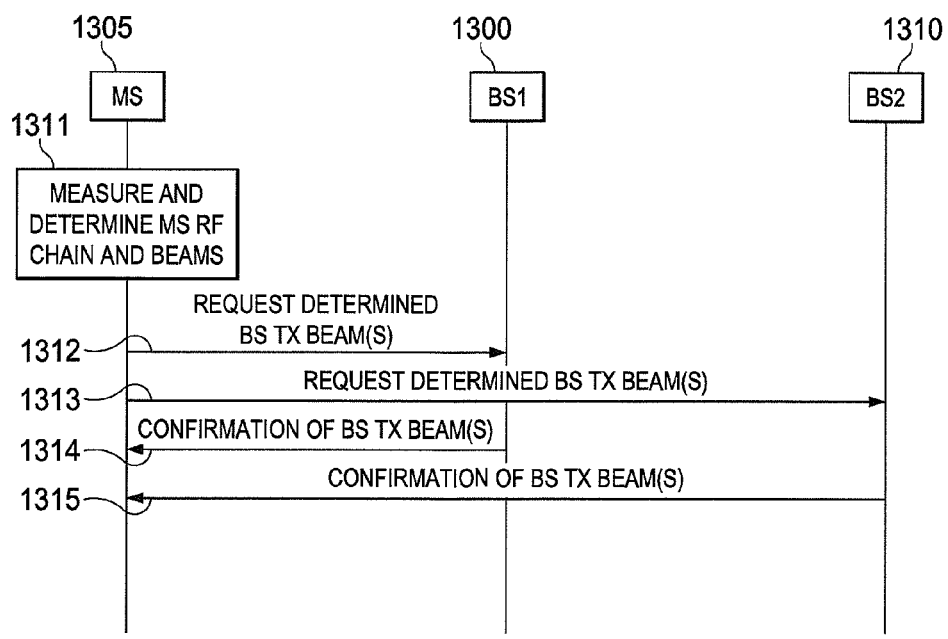
FIG. 13 illustrates a flow diagram of a process for beam management where a mobile station determines and requests a preferred transmission scheme for multi-point communication for multiple base stations in accordance with an exemplary embodiment of the present disclosure.

FIG. 13 illustrates a flow diagram of a process for beam management where a MS 1305 determines and requests a preferred transmission scheme for multi-point communication for multiple base stations in accordance with an exemplary embodiment of the present disclosure. In this illustrative embodiment, the MS 1305 measures and determines a transmission scheme including BS TX beams for BS1 1300 and BS2 1310 and associated RF chains (step 1311). The MS 1305 requests the determined BS TX beams from BS1 1300 and BS2 1310 (steps 1312 and 1313). The MS 1305 may determine the BS TX beams based on the beamforming capability of the MS 1305, measurements on BS TX beam and MS RX beam pairs, and/or known capability information of the BS1 1300 and BS2 1310, as described above, for example, with regard to FIG. 8. The BSs 1300 and 1310 confirm the requested BS TX beams to the MS 1305 (steps 1314 and 1315). The MS 1205 may then form the RX beams based on the requested BS TX beams.

Figure 14:
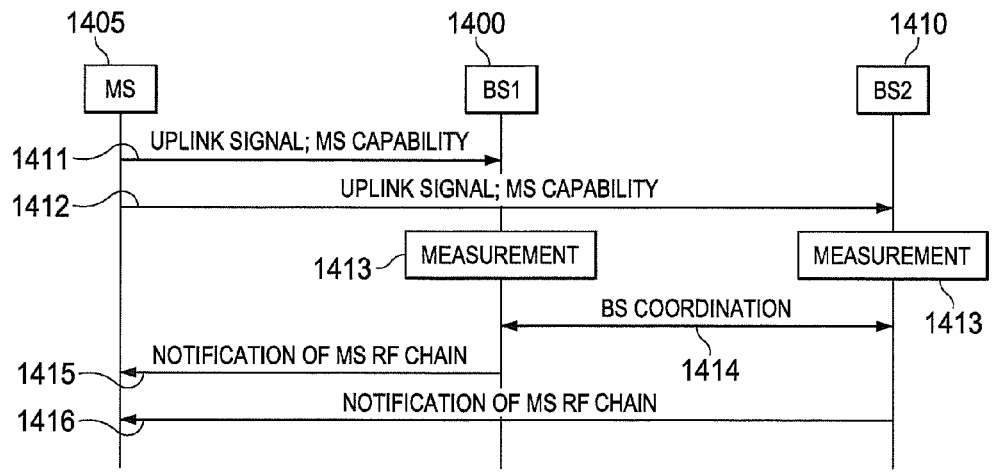
FIG. 14 illustrates a flow diagram of a process for beam management where base stations use uplink signals to measure beam pairs and coordinate to determine a transmission scheme based on beamforming capability information of a mobile station in accordance with an exemplary embodiment of the present disclosure.

FIG. 14 illustrates a flow diagram of a process for beam management where BSs use uplink signals to measure beam pairs and coordinate to determine a transmission scheme based on beamforming capability information of a MS 1405 in accordance with an exemplary embodiment of the present disclosure. In this illustrative embodiment, the MS 1405 sends MS beamforming capability information and an uplink signal to the BSs 1400 and 1410 (or other network entity) (steps 1411 and 1412). The MS beamforming capability information may include information on beamforming constraints, e.g., which MS beams cannot be steered, formed, or used at the same time. The BSs 1400 and 1410 perform uplink measurements (step 1413). For example, the MS 1405 may use the same beams for transmitting and receiving, i.e., the TX and RX beams of the MS 1405 may be the same e.g., in a time division multiplexing communication system or a communication system where the channel is reciprocal. The BSs 1400 and 1410 (or other network entity) perform coordination and determine which transmission scheme to use (step 1414). The determination may be based on the measurement results, the MS beamforming capability limitations on concurrent beams if there are multiple streams to deliver to the MS, and the BS beamforming capability limitations, as described above, for example, with regard to FIG. 9. The BSs 1400 and 1410 then notify the MS 1405 about which MS RF chain(s) are to be used by the respective BS for future communications (steps 1415 and 1416).

Figure 15:
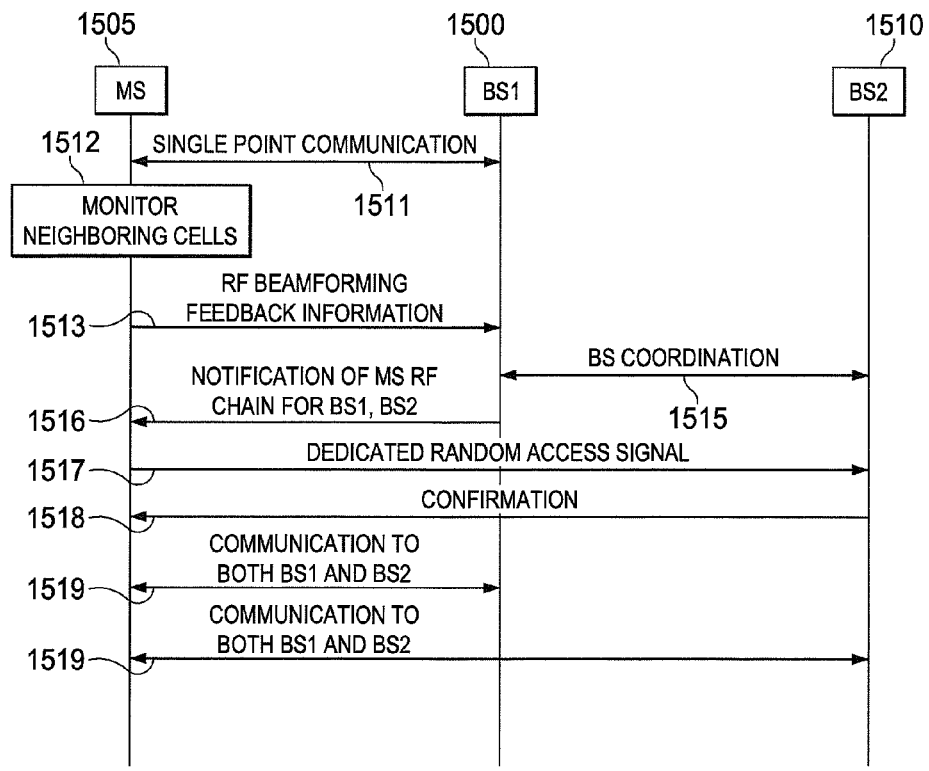
FIG. 15 illustrates a flow diagram of a process for beam management where a mobile station dynamically notifies base stations about the beamforming capabilities of the mobile station for the base stations to coordinate and determine transmission schemes in accordance with an exemplary embodiment of the present disclosure.

FIG. 15 illustrates a flow diagram of a process for beam management where a MS 1505 dynamically notifies BSs 1500 and 1510 about the beamforming capabilities of the MS 1005 for the BSs to coordinate and determine transmission schemes in accordance with an exemplary embodiment of the present disclosure. In this illustrative embodiment, the BS2

1510 may be idle, or single point communication may be occurring with the BS1 1500 (step 1511).

The MS 1505 monitors neighboring cells (step 1512) and may then, at some point, determine that multiple stream communication is desired, for example, based on detecting the availability of the BS2 1510 due to network conditions or a desire for multi-point communication. The MS 1505 sends the appropriate RF beamforming feedback information (step 1513). The RF beamforming feedback information may include the measurement reporting, the MS beamforming capability information, possible sets of BS TX beam and MS RX beam pairs, a requests for a desired transmission scheme, and/or requests for BS TX beams as described in any of the various beam management embodiments above. The BSs 1500 and 1510 (or other network entity) perform coordination and determine which transmission scheme (e.g., which BS uses which MS RF processing chain) to use (step 1515). The BS 1500 sends control information to the MS 1505 indicating the transmission scheme to be used for the multiple steam communication (step 1516). For example, this control information may include BS TX beam and MS RX beam pairs, BS TX beams, MS RX beam pairs, or a confirmation of the MS requested transmission scheme. Thereafter, the MS 1505 performs ranging with the BS2 1510 (steps 1517 and 1518) and multi-point communication with the BS1 1500 and the BS2 1510 (step 1519).

In various embodiments, a MS has the flexibly to manage the beams of different RF processing chains for communications and/or monitoring of cells. For example, a MS (e.g., the MS 1100 in FIG. 11A or the MS 1150 in FIG. 11B) can have an uplink connection with a first BS 1105, and a downlink connection with a second BS 1110. The MS can use a first RF chain to communicate with the first BS 1105, and a second RF chain to communicate with the second BS 1110. In an example where the first RF chain is used for uplink communication with the first BS 1105 but not for downlink communications, the MS 1100 may use the first RF chain at the times scheduled for downlink to use its RX beams to monitor for neighboring cells and beams.

Figure 16:
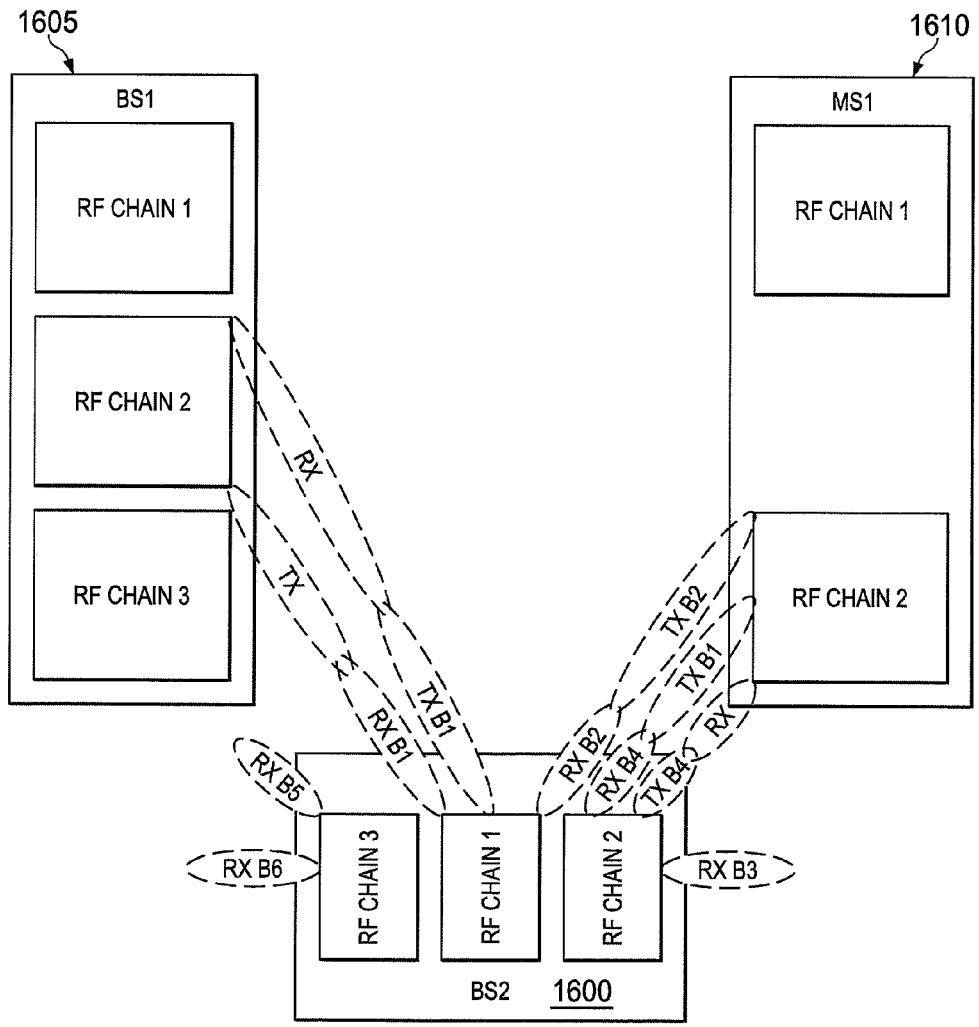
FIG. 16 illustrates an example of a base station concurrently connected to a base station and a mobile station using multiple RF chains in accordance with an exemplary embodiment of the present disclosure.

FIG. 16 illustrates an example of a BS2 1600 concurrently connected to a BS1 1605 and a MS1 1610 using multiple RF chains in accordance with an exemplary embodiment of the present disclosure. In this illustrative example, the BS2 1600 can use RF chain 1 to communicate with the BS1 1605 and the MS1 1610 at different times and use RF chain 2 to communicate with the MS1 1610. The BS2 1600 may also use the RF chain 2 and the RF chain 3 (during times when not being used for communication with the MS1 1610) to monitor for neighboring cells and beams. While FIG. 16 illustrates one example of a BS2 1600 concurrently connected to a BS1 1605 and a MS1 1610, embodiments of the present disclosure can be implemented where a BS or MS communicates with any number of mobile stations and/or base stations using any number of different RF processing chains.

In the embodiments of the present disclosure, the MS 1100 can also report the delay (e.g., the delay from the BS TX beam to the MS RX beam) associated with the reported TX beam, or TX RX beam pairs, etc. The delay may also be used for the BSs or other network entity to make decisions on the transmit schemes. In the embodiments of the present disclosure, the MS 1100 can report a codeword in the codebook as an alternative way of reporting the beam pairs, or the TX beams. The MS 1100 can also report a degree of freedom. The codeword can be from a codebook for RF beamforming, analog beamforming, digital beamforming, joint digital beamforming, or joint RF beamforming. The MS 1100 may choose a preferred codeword on RF beamforming and report to the base station, and the codeword can further be used by the base station or other network entity as one of the factors to determine the digital beamforming codeword and transmission schemes, such as the transmission rank or the number of the different data streams the transmitter would transmit.

Although embodiments of the present disclosure may be described in the context of communication with millimeter waves, embodiments of the present disclosure may also be implemented in other communication media, e.g., radio waves with frequency of 10 GHz-30 GHz that exhibit similar properties as millimeter waves, or in existing cellular communication bands. Further, various embodiments of the present disclosure may also be implemented using electromagnetic waves with terahertz frequencies, infrared, visible light, and other optical media.

Figure 17:
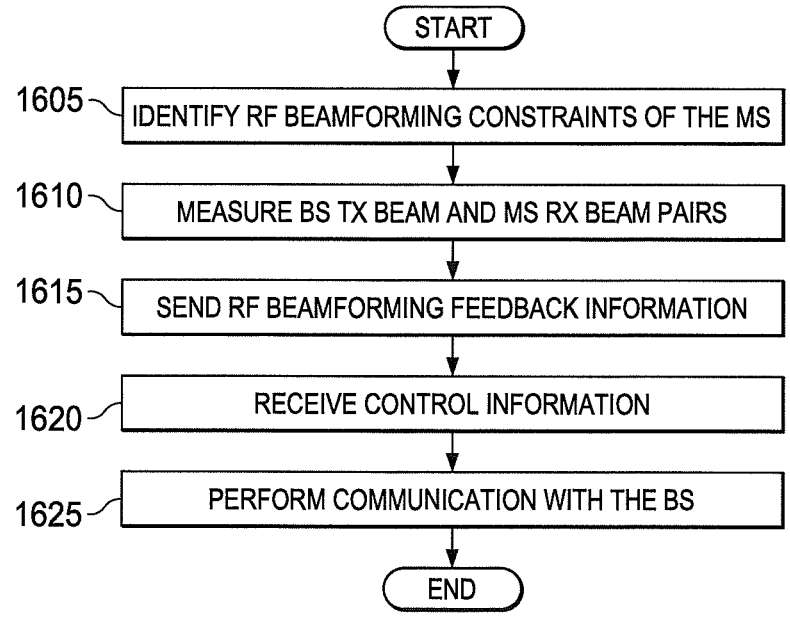
FIG. 17 illustrates a flowchart of a process for beam management by a mobile station in accordance with various embodiments of the present disclosure.

FIG. 17 illustrates a flowchart of a process for beam management by a mobile station in accordance with various embodiments of the present disclosure. For example, the process depicted in FIG. 17 may be performed by a mobile station (MS), such as the MS 410 in FIG. 4 or the receiver 550 in FIG. 5A.

The process begins with the MS identifying radio frequency (RF) beamforming constraints of the MS (step 1705). In step 1705, the radio frequency (RF) beamforming constraints of the MS may be based on a number of RX beams that can be concurrently formed based on physical limitations of the MS or based on BS TX beams that can be received due, for example, to network conditions.

The MS then measures base station (BS) transmit (TX) beam and MS receive (RX) beam pairs (step 1710). Thereafter, the MS sends RF beamforming feedback information (step 1715). In step 1715, the RF beamforming feedback information may include an indication of which MS beams cannot be used simultaneously and an indication of the BS TX beam and MS RX beam pairs and associated measurements. In another example, the RF beamforming feedback information may include an indication of the at least one set of BS TX beam and MS RX beam pairs that can be used simultaneously to the BS based on the RF beamforming constraints of the MS and/or the BS. In another example, the RF beamforming feedback information may include a request for the BS to use BS TX beams from the possible sets of BS TX beam and MS RX beam pairs to reduce signaling overhead. In another example, the MS may determine to send this RF beamforming feedback information in response to determining to perform multi-stream and/or multi point communication.

The MS then receives control information (step 1720). In step 1720, the control information may be sent by the BS or another network entity. The control information may include a notification of which MS RX beams to use, a notification of the TX beams being used by the BS, a continuation of the BS TX beams requested by the MS, and/or a notification of which MS RF processing chain to use for communication with different BSs.

Thereafter, the MS performs communication with the BS (step 1725). In step 1725, the MS may identify the RX beams and/or RF processing chain to use to receive the associated TX beams to perform downlink communication. The MS may also perform uplink communication using a similar configuration, for example, in a TDD system or other system where the communication channel is reciprocal.

Figure 18:
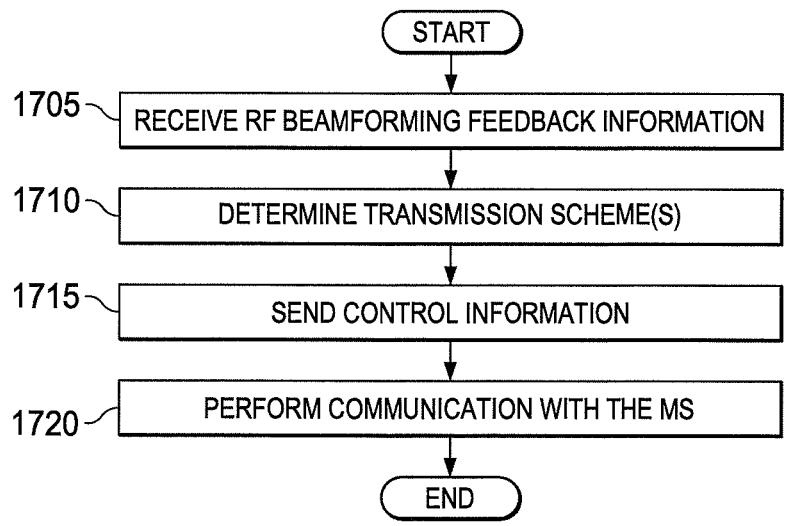
FIG. 18 illustrates a flowchart of a process for beam management by a base station in accordance with various embodiments of the present disclosure.

FIG. 18 illustrates a flowchart of a process for beam management by a base station in accordance with various embodiments of the present disclosure. For example, the process depicted in FIG. 18 may be performed by a network entity such as the BS 401 or the network 411 in FIG. 4 or the transmitter 500 in FIG. 5A.

The process begins with receiving RF beamforming feedback information (step 1805). In step 1805, the RF beamforming feedback information may include radio frequency (RF) beamforming constraints of a MS, information about measured BS TX beam and MS RX beam pairs, an indication of which MS beams cannot be used simultaneously based on the RF beamforming constraints of the MS and/or BS, an indication of possible set(s) of BS TX beam and MS RX beam pairs that can be used simultaneously based on the RF beamforming constraints of the MS and/or BS, a request for the BS to use BS TX beams from possible set(s) of BS TX beam and MS RX beam pairs, and/or RF processing chains used for coordinated multipoint communication with multiple BS.

The process then determines the transmission scheme(s) (step 1810). The transmission schemes determined may include single-stream communication, multiple-stream communication at non-concurrent time for each steam where the information over multiple-stream is the same, multiple-stream communication at concurrent time where the information over multiple-stream is the same, multiple-stream communication at non-concurrent time for each steam where the information over multiple-stream is different, multiple-stream communication at concurrent time where the information over multiple-stream is different, and the like.

The process then sends control information (step 1815). In step 1815, the BS or other network entity may send the control information to the MS to indicate the transmission scheme to the MS. The control information may include an indication of MS RX beams and/or BS TX beams to be used in downlink communication with the MS based on the received RF beamforming feedback information, or a confirmation of the requested BS TX beams. As part of this step, the BS or other network entity may coordinate with a second BS to determine which MS RF processing chain to use and include a notification of which MS RF processing chain to use for communication with the respective BSs in the control information.

Thereafter, the process performs communication with the MS (step 1820). In step 1820, the BS or other network entity may perform the communication using BS TX beams according to the determined transmission scheme.

Although FIGS. 17 and 18 illustrate examples of processes for beam management by a MS and a BS, respectively, various changes could be made to FIGS. 17 and 18. For example, while shown as a series of steps, various steps in each figure could overlap, occur in parallel, occur in a different order, or occur multiple times. In other examples, steps of the base station could be performed by other network entities, such as a remote radio head, a network server, a base station controller, a gateway, etc.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for beam management by a mobile station (MS), the method comprising:
   identifying beamforming constraints of the MS including which MS beams can and cannot be used simultaneously;
   performing measurement on a channel between a base station (BS) and the MS on at least one transmit (TX) beam of the BS and at least one receive (RX) beam of the MS;
   sending beamforming feedback information based on the identified constraints of the MS and the channel measurement; and
   in response to a notification of downlink scheduling indicating a transmission scheme and one or more BS TX beams to be used, receiving downlink communication from the BS using one or more MS RX beams that can receive the one or more BS TX beams indicated.

2. The method of claim 1, wherein sending the beamforming feedback information comprises sending an indication of the MS beams that cannot be used simultaneously to a BS and sending a channel measurement report to the BS, and the transmission scheme includes at least one of single stream communication, multiple stream communication at different times, or multiple stream communication at a concurrent time.

3. The method of claim 1 further comprising identifying at least one set of BS TX beam and MS RX beam pairs that can be used simultaneously based on the beamforming constraints of the MS, wherein sending the beamforming feedback information comprises sending an indication of the at least one set of BS TX beam and MS RX beam pairs that can be used simultaneously to the BS, wherein the transmission scheme includes at least one of single stream communication, multiple stream communication at different times, or multiple stream communication at a concurrent time.

4. The method of claim 1 further comprising identifying at least one set of BS TX beam and MS RX beam pairs that can be used simultaneously based on the beamforming constraints of the MS, wherein sending the beamforming feedback information comprises sending an indication of at least one set of BS TX beams from the at least one set of BS TX beam and MS RX beam pairs that can be used simultaneously to the BS, wherein the transmission scheme includes at least one of single stream communication, multiple stream communication at different times, or multiple stream communication at a concurrent time.

5. The method of claim 1, wherein the BS is a first BS and sending the beamforming feedback information comprises sending the beamforming feedback information in response to determining to perform coordinated multipoint communication, the method further comprising:
   receiving the notification of downlink scheduling indicating the transmission scheme and the one or more BS TX beams to be used for the first BS and one or more BS TX beams to be used for a second BS,
   wherein receiving the downlink communication comprises receiving the downlink communication from the first BS using the one or more MS RX beams that can receive the one or more BS TX beams indicated to be used for the first BS, and
   wherein the transmission scheme includes at least one of single stream communication, multiple stream communication at different times, or multiple stream communication at a concurrent time.

6. A method for beam management by a base station (BS), the method comprising:
   receiving beamforming feedback information comprising at least one of beamforming constraints of a mobile station (MS) or channel measurement information on a channel between the BS and the MS; and
   sending, to the MS, control information comprising an indication of one or more BS TX beams to be used in downlink communication with the MS based on the received beamforming feedback information.

7. The method of claim 6, wherein the beamforming feedback information includes an indication of which MS beams cannot be used simultaneously and a channel measurement report, the method further comprising:

determining a transmission scheme and the one or more BS TX beams to be used based on the indication of which MS beams cannot be used simultaneously, wherein sending the control information comprises sending a notification of the transmission scheme, and wherein the transmission scheme includes at least one of single stream communication, multiple stream communication at different times, or multiple stream communication at a concurrent time.

8. The method of claim 6, wherein the beamforming feedback information includes an indication of at least one set of BS TX beam and MS RX beam pairs that can be used simultaneously based on the beamforming constraints of the MS, the method further comprising:

determining a transmission scheme and the one or more BS TX beams to be used based on the indication of at least one set of BS TX beam and MS RX beam pairs that can be used simultaneously, wherein sending the control information comprises sending a notification of the transmission scheme, and wherein the transmission scheme includes at least one of single stream communication, multiple stream communication at different times, or multiple stream communication at a concurrent time.

9. The method of claim 6, wherein the beamforming feedback information includes an indication of at least one set of BS TX beams from at least one set of BS TX beam and MS RX beam pairs that can be used simultaneously, the method further comprising:

determining a transmission scheme and the one or more BS TX beams to be used based on the indication of the at least one set of BS TX beams, wherein sending the control information comprises sending a notification of the transmission scheme, and wherein the transmission scheme includes at least one of single stream communication, multiple stream communication at different times, or multiple stream communication at a concurrent time.

10. The method of claim 6, wherein the BS is a first BS and wherein the RF beamforming feedback information is received in response to a determination to perform coordinated multipoint communication, the method further comprising:

coordinating with a second BS to determine a transmission scheme and the one or more BS TX beams to be used, wherein sending the control information comprises sending a notification of the transmission scheme, and wherein the transmission scheme includes at least one of single stream communication, multiple stream communication at different times, or multiple stream communication at a concurrent time.

11. An apparatus in a mobile station (MS), the apparatus comprising:

a controller configured to identify beamforming constraints of the MS including which MS beams can and cannot be used simultaneously, and perform measurement on a channel between a base station (BS) and the MS on at least one transmit (TX) beam and at least one MS receive (RX) beam; and a transceiver configured to send beamforming feedback information based on the identified constraints of the MS and the channel measurement; and in response to a notification of downlink scheduling indicating a transmission scheme and one or more BS TX beams to be used, receive downlink communication from the BS using one or more MS RX beams that can receive the one or more BS TX beams indicated.

12. The apparatus of claim 11, wherein:

in sending the beamforming feedback information, the transceiver is configured to send an indication of the MS beams that cannot be used simultaneously to a BS and send a channel measurement report to the BS, and the transmission scheme includes at least one of single stream communication, multiple stream communication at different times, or multiple stream communication at a concurrent time.

13. The apparatus of claim 11, wherein:

the controller is configured to identify at least one set of BS TX beam and MS RX beam pairs that can be used simultaneously based on the beamforming constraints of the MS, in sending the beamforming feedback information, the transceiver is configured to send an indication of the at least one set of BS TX beam and MS RX beam pairs that can be used simultaneously to the BS, and the transmission scheme includes at least one of single stream communication, multiple stream communication at different times, or multiple stream communication at a concurrent time.

14. The apparatus of claim 11, wherein:

the controller is configured to identify at least one set of BS TX beam and MS RX beam pairs that can be used simultaneously based on the beamforming constraints of the MS, in sending the RF beamforming feedback information, the transceiver is configured to send an indication of at least one set of BS TX beams from the at least one set of BS TX beam and MS RX beam pairs that can be used simultaneously to the BS, and the transmission scheme includes at least one of single stream communication, multiple stream communication at different times, or multiple stream communication at a concurrent time.

15. The apparatus of claim 11, wherein:

the BS is a first BS, in sending the beamforming feedback information, the transceiver is configured to send the beamforming feedback information in response to a determination to perform coordinated multipoint communication, the transceiver is further configured to receive the notification of downlink scheduling indicating the transmission scheme and the one or more BS TX beams to be used for the first BS and one or more BS TX beams to be used for a second BS and, in response to the notification, receive downlink communication from the first BS using the one or more MS RX beams that can receive the one or more BS TX beams indicated to be used for the first BS, and the transmission scheme includes at least one of single stream communication, multiple stream communication at different times, or multiple stream communication at a concurrent time.

16. An apparatus in a base station (BS), the apparatus comprising:

a transceiver configured to:
receive beamforming feedback information comprising at least one of beamforming constraints of a mobile station (MS) or channel measurement information on a channel between the BS and the MS, and send, to the MS, control information comprising an indication of one or more BS TX beams to be used in downlink communication with the MS based on the received beamforming feedback information.

17. The apparatus of claim 16, wherein the beamforming feedback information includes an indication of which MS beams cannot be used simultaneously and a channel measurement report, the apparatus further comprising:
- a controller configured to determine a transmission scheme and the one or more BS TX beams to be used based on the indication of which MS beams cannot be used simultaneously,
- wherein in sending the control information, the transceiver is configured to send a notification of the transmission scheme, and
- wherein the transmission scheme includes at least one of single stream communication, multiple stream communication at different times, or multiple stream communication at a concurrent time.

18. The apparatus of claim 16, wherein the beamforming feedback information includes an indication of at least one set of BS TX beam and MS RX beam pairs that can be used simultaneously based on the beamforming constraints of the MS, the apparatus further comprising:
- a controller configured to determine a transmission scheme and the one or more BS TX beams to be used based on the indication of at least one set of BS TX beam and MS RX beam pairs that can be used simultaneously,
- wherein in sending the control information, the transceiver is configured to send a notification of the transmission scheme, and
- wherein the transmission scheme includes at least one of single stream communication, multiple stream communication at different times, or multiple stream communication at a concurrent time.

19. The apparatus of claim 16, wherein the beamforming feedback information includes an indication of at least one set of BS TX beams of a at least one set of BS TX beam and MS RX beam pairs that can be used simultaneously, the apparatus further comprising:
- a controller configured to determine a transmission scheme and the one or more BS TX beams to be used based on the indication of the at least one set of BS TX beams,
- wherein in sending the control information, the transceiver is configured to send a notification of the transmission scheme, and
- wherein the transmission scheme includes at least one of single stream communication, multiple stream communication at different times, or multiple stream communication at a concurrent time.

20. The apparatus of claim 16, wherein the BS is a first BS and wherein the beamforming feedback information is received in response to a determination to perform coordinated multipoint communication, the apparatus further comprising:
- a controller configured to coordinate with a second BS, via the transceiver, to determine a transmission scheme and the one or more BS TX beams to be used,
- wherein in sending the control information, the transceiver is configured to send a notification of the transmission scheme, and
- wherein the transmission scheme includes at least one of single stream communication, multiple stream communication at different times, or multiple stream communication at a concurrent time.

* * * * *